US010232719B2

(12) United States Patent
Tajima

(10) Patent No.: US 10,232,719 B2
(45) Date of Patent: Mar. 19, 2019

(54) ELECTRIC VEHICLE AND VEHICLE POWER FEEDING METHOD

(71) Applicant: HONDA MOTOR CO., LTD., Tokyo (JP)

(72) Inventor: Takamitsu Tajima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 194 days.

(21) Appl. No.: 15/128,944

(22) PCT Filed: Feb. 19, 2015

(86) PCT No.: PCT/JP2015/054663
§ 371 (c)(1),
(2) Date: Sep. 23, 2016

(87) PCT Pub. No.: WO2015/146392
PCT Pub. Date: Oct. 1, 2015

(65) Prior Publication Data
US 2017/0106761 A1    Apr. 20, 2017

(30) Foreign Application Priority Data
Mar. 27, 2014    (JP) .................................. 2014-064912

(51) Int. Cl.
*H02J 7/00*        (2006.01)
*B60L 11/00*       (2006.01)
(Continued)

(52) U.S. Cl.
CPC ............. *B60L 11/1811* (2013.01); *B60L 5/36* (2013.01); *B60L 11/1803* (2013.01);
(Continued)

(58) Field of Classification Search
CPC ... H02J 7/0027; H02J 7/0045; B60L 11/1811; B60L 11/1808; B60L 11/1816;
(Continued)

(56) References Cited

U.S. PATENT DOCUMENTS 6,034,515 A     3/2000  Hirmer
8,169,186 B1 *  5/2012  Haddad .............. B60L 11/1835
                                                180/14.3
(Continued)

FOREIGN PATENT DOCUMENTS

JP    2001-128304 A    5/2001
JP    2006-246568 A    9/2006
(Continued)

OTHER PUBLICATIONS

Takamitsu et al., Machine English translation of Japanese Patent Application Publication No. 2013-208008, machine translated on May 26, 2018 by JPO website, 17 pages.*

(Continued)

*Primary Examiner* — Phallaka Kik
(74) *Attorney, Agent, or Firm* — Westerman, Hattori, Danield & Adrian, LLP

(57) ABSTRACT

Provided are an electric vehicle and a vehicle power feeding method capable of charging, at an ultra-high speed, an electricity storage device of the electric vehicle that travels on a trackless road. A control device of the electric vehicle executes a first charging control for controlling a voltage converter to limit the input current from a power feeding portion to an electricity storage device or the variation of the input current per unit time and allowing the voltage converter to charge the electricity storage device; and a second charging control for, for example, slopping the transforming operation of the voltage converter and allowing the voltage converter to charge the electricity storage device. Both charging controls are executed while moving the contact point between an electrical connection portion and the power feeding portion, and the execution time of the second charging control is longer than that of the first charging control.

6 Claims, 11 Drawing Sheets

(51) Int. Cl.
*B60L 11/18* (2006.01)
*B60L 5/36* (2006.01)
*B60M 1/30* (2006.01)

(52) U.S. Cl.
CPC ......... *B60L 11/185* (2013.01); *B60L 11/1816* (2013.01); *B60L 11/1818* (2013.01); *B60L 11/1825* (2013.01); *B60L 11/1827* (2013.01); *B60M 1/30* (2013.01); *H02J 7/007* (2013.01); *H02J 7/0027* (2013.01); *H02J 7/0045* (2013.01); *B60L 2210/14* (2013.01); *B60L 2210/30* (2013.01); *B60L 2210/44* (2013.01); *B60L 2220/10* (2013.01); *B60L 2230/10* (2013.01); *B60L 2240/12* (2013.01); *B60L 2240/54* (2013.01); *B60L 2270/20* (2013.01); *Y02T 10/7005* (2013.01); *Y02T 10/7055* (2013.01); *Y02T 10/7072* (2013.01); *Y02T 10/7225* (2013.01); *Y02T 90/121* (2013.01); *Y02T 90/125* (2013.01); *Y02T 90/127* (2013.01); *Y02T 90/128* (2013.01); *Y02T 90/14* (2013.01)

(58) Field of Classification Search
CPC ............... B60L 11/1827; B60L 11/185; B60L 2210/30; B60L 2210/44; B60L 2220/10; B60L 2230/10; B60L 2240/12; B60L 2240/54
USPC .................. 320/109, 104, 140, 167
See application file for complete search history.

(56) References Cited

U.S. PATENT DOCUMENTS

| | | | | |
|---|---|---|---|---|
| 9,902,275 | B2* | 2/2018 | Park | B60L 11/1811 |
| 10,090,567 | B2* | 10/2018 | Austin | B60L 11/1824 |
| 2005/0178632 | A1* | 8/2005 | Ross | B60L 5/005 |
| | | | | 191/10 |
| 2010/0039067 | A1* | 2/2010 | Hill | B60L 5/42 |
| | | | | 320/109 |
| 2012/0326668 | A1* | 12/2012 | Ballatine | H02J 1/102 |
| | | | | 320/109 |
| 2013/0009593 | A1* | 1/2013 | Takahashi | H02J 7/0091 |
| | | | | 320/107 |
| 2013/0049676 | A1* | 2/2013 | Ishikawa | B60L 11/185 |
| | | | | 320/103 |
| 2013/0090797 | A1* | 4/2013 | Izumi | B60L 11/123 |
| | | | | 701/22 |
| 2014/0225561 | A1* | 8/2014 | Hasegawa | H02J 5/00 |
| | | | | 320/108 |
| 2016/0121734 | A1* | 5/2016 | Storm | B60L 3/00 |
| | | | | 701/22 |
| 2016/0303986 | A1* | 10/2016 | Park | B60L 11/18 |
| 2017/0222473 | A1* | 8/2017 | Schawitsch | H02J 7/1423 |

FOREIGN PATENT DOCUMENTS

| | | |
|---|---|---|
| JP | 2008-263741 A | 10/2008 |
| JP | 2009-171772 A | 7/2009 |
| JP | 2010-233317 A | 10/2010 |
| JP | 2013-208008 A | 10/2013 |
| JP | 2013-233037 A | 11/2013 |

OTHER PUBLICATIONS

Yutaka, Machine translation of Japanese Patent Application Publication No. 2010-2333137, machine translated on May 26, 2018, by JPO website, 22 pages.*

Takamitsu et al., Machine English translation of Japanese Patent Application Publication No. 2013-233037, machine translated on May 26, 2018, 45 pages.*

International Search Report dated Apr. 21, 2015, issued in counterpart International Application No. PCT/JP2015/054663 (1 page).

Extended (supplementary) European Search Report dated Nov. 2, 2017, issued in counterpart European Application No. 15769812.7. (10 pages).

* cited by examiner

ELECTRIC VEHICLE AND VEHICLE POWER FEEDING METHOD

TECHNICAL FIELD

The present invention relates to an electric vehicle that travels on a trackless trajectory and a vehicle power supplying (feeding) method in which the electric vehicle is used. More specifically, the present invention relates to an electric vehicle and a vehicle power supplying method in which the electric vehicle is used, which are capable of supplying power at ultra-high-speed by bringing an energizing arm into contact with external power lines during traveling.

BACKGROUND ART

Heretofore, as charging methods for an electric vehicle, there have been known contact type charging for charging an electric vehicle by having a charging nozzle connect to the electric vehicle while the electric vehicle is stopped, and non-contact charging for charging the electric vehicle through magnetic forces in a non-contact state.

In the former method, even in the case of a comparatively fast rapid charging system, with currently installed charging devices, time on the order of thirty minutes is required until the electric vehicle becomes fully charged, and the usefulness of such charging devices is low in comparison with gasoline-powered vehicles.

Although the latter non-contact charging method carries out charging through magnetic forces, problems have existed in that the charging power is lower as the influence of magnetic forces on the exterior must be taken into consideration, or investment costs in infrastructure become high due to complexity of the technology and equipment.

Notwithstanding, practical use of an electric vehicle is urgently needed from the standpoint of environmental issues, and there has been a demand to develop at an early stage an electric vehicle having the same level of convenience as a gasoline-powered vehicle.

Thus, as disclosed in Japanese Laid-open Patent Publication No. 2006-246568 and Japanese Laid-open Patent Publication No. 2001-128304, in order to enhance the convenience of the electric vehicle, techniques have been proposed for charging during traveling of the vehicle. However, all of these techniques are in a conceptual phase, and heretofore none of them have actually been studied deeply and embodied in detailed form.

Further, as techniques that are comparatively close from the standpoint of enabling charging during traveling and for which progress is notable, techniques for hybrid (electric) trains exist, as disclosed in Japanese Laid-open Patent Publication No. 2008-263741 and Japanese Laid-open Patent Publication No. 2009-171772. In such techniques, a vehicle or a train that travels on a track travels along an electrified section and a non-electrified section. In addition, within the electrified section, charging of a vehicle-mounted energy storage device is carried out while the vehicle is traveling with electrical power from aerial power lines, whereas within the non-electrified section, the vehicle travels with charged power from the energy storage device.

However, in the case that the vehicle is traveling on a track, the electrified section is constructed on the assumption that traveling of the vehicle occurs at a predetermined vehicle speed roughly from the beginning to the end thereof. Therefore, in order to enable full charging of the energy storage device within the electrified section, in accordance therewith, the lengths of the electrified section and the non-electrified section, and the charging speed should be set appropriately.

However, the charging time is not assured under an environment such as when traveling takes place on a trackless trajectory, in which the vehicle speed within the electrified section and contact with and separation away from the power lines are controlled in accordance with the intentions of the driver. Therefore, the ideas differ fundamentally, and it has not been possible to simply put to use the technology of hybrid trains.

In view of this situation, the present applicant has proposed the technique disclosed in Japanese Laid-Open Patent Publication No. 2013-208008 (hereinafter referred to as "JP2013-208008A"). With the power supplying control of JP2013-208008A (see FIGS. 4 through 6), prior to a power receiving arm AM coming into contact with power line contact terminals CT, i.e., "II: immediately before supply of power", a pre-charging process is carried out. Further, after the power receiving arm AM has contacted the power line contact terminals CT, i.e., upon "III: initial of supply of power", a current that flows in a high voltage battery 24 (battery current Ib) is controlled so as to increase gradually. Thereafter, i.e., upon "IV: supply of power", an external power supplying portion 12 and the high voltage battery 24 are directly connected to each other.

SUMMARY OF INVENTION

As noted above, according to JP 2013-208008A, the control is changed by being divided into "II: immediately before supply of power", "III: initial supply of power", and "IV: supply of power" states. According to JP2013-208008A, during charging, a current increasing section ("III: initial supply of power") during which the battery current Ib is limited cakes a long time (see FIG. 6). Therefore, the charging time is still long, and responsive thereto, since the aerial line section must also be long, problems have occurred in putting this technique into practice.

The present invention has been devised taking into consideration the aforementioned problems, and has the object of providing an electric vehicle and a vehicle power supplying method in which the electric vehicle is used, which are capable of charging at ultra-high-speed an energy storage device of the electric vehicle that travels on a trackless trajectory.

An electric vehicle according to the present invention travels on a trackless trajectory, wherein the electric vehicle comprises a traction motor, an energy storage device configured to supply electrical power to the traction motor, an energizing portion configured to come into contact with a power supplying portion and to connect electrically between the power supplying portion and the energy storage device, a voltage converter configured to adjust supply of electrical power to the energy storage device from the power supplying portion via the energizing portion, and a control unit configured to control the voltage converter. The control unit is configured to carry out a first charging control to charge the energy storage device by controlling the voltage converter so as to control an input current or an amount of change per unit time of the input current from the power supplying portion to the energy storage device, and a second charging control to charge the energy storage device with electrical power from the power supplying portion in which a converting operation of the voltage converter is stopped and voltage conversion is not carried out, or to charge the energy storage device by controlling the voltage converter on a basis of a target electrical power which is a target value of electrical power supplied to the energy storage device. Furthermore, the control unit is configured to implement the first charging control and the second charging control while a point of contact between the energizing portion and the power supplying portion is moved, implement the first charging control when the energizing portion comes into contact with the power supplying portion, and implement the second charging control after the first charging control, and for a period of time longer than that of the first charging control.

According to the present invention, when the energizing portion contacts the power supplying portion, the first charging control is carried out in which the input current to the energy storage device (including an amount of charge per unit time thereof) is treated as the control object. Owing thereto, an instantaneous surge current at the time that energizing is started can be prevented, and welding or fusion between the power supplying portion and the energizing portion, or damage to the electrical circuitry on the side of the power supplying portion or on the side of the energizing portion can be prevented. Further, after the first charging control, the second charging control, which implements supply of power without voltage conversion or implements supply of power using the target electrical power (more specifically, supply of power in which the input current and the input voltage to the energy storage device are not directly limited), is carried out for a longer time period than that of the first charging control. Accordingly, charging over a very short time is enabled by a combination of the first charging control and the second charging control.

Furthermore, under a control environment ranging from the first charging control to the second charging control, by bringing the power supplying portion and the energizing portion into contact while the contact point therebetween is moved, generation of heat at the contact point is not concentrated in one location. Consequently, even if a high current is energized in the second charging control, which is performed longer than the first charging control, welding or fusion between the power supplying portion and the energizing portion, or damage to the electrical circuitry on the side of the power supplying portion or on the side of the energizing portion can be prevented.

Further still, because charging can be performed in an extremely short time period by the first charging control and the second charging control, charging of the energy storage device can be carried out reliably, even in situations that have been problematic in the case of traveling on a trackless trajectory, in which, according to the driver's intention, the contact position with the power supplying portion and the separation position from the power supplying portion are changed, and further, in which the charging time period is unpredictable due to the power supplying section, which is defined by the power supplying portion, being traveled through at high speed.

In addition, since charging can be performed in a very short time period, the installation distance between and the number of power supplying sections can be kept to a minimum, and investment costs in infrastructure can be reduced.

When an input voltage to the energy storage device during the second charging control arrives at a fully charged voltage of the energy storage device, the control unit may implement a third charging control to operate the voltage converter so as to maintain the input voltage at the fully charged voltage. Owing thereto, the energy storage device can be fully charged more reliably.

Roller-shaped terminals that contact the power supplying portion may be formed on a distal end of the energizing portion. By this feature, damage to the contact site of the energizing portion with respect to the power supplying portion can be lightened or alleviated.

The electric vehicle may comprise an aim displacement mechanism that causes the energizing portion to project out laterally of a vehicle body during traveling. Owing thereto, since it is possible for the power supplying portion to be disposed laterally of the travel path, installation of the power supplying portion can be performed at low cost. More specifically, compared to a case in which the power supplying portion is arranged upwardly of the vehicle body, since it is possible to dispose the power supplying portion at a lower position, it is possible to simplify equipment for supporting the power supplying portion. Further, although it is necessary to embed the power supplying portion in the travel path in the case that the power supplying portion is arranged below the vehicle body, in the case that the power supplying portion is arranged to the side of the travel path, there is no need to embed the power supplying portion in the travel path. Therefore, it is possible for the power supplying portion to be arranged with ease.

A vehicle power supplying method according to the present invention charges an energy storage device of an electric vehicle by electrical power from an external power supplying apparatus in a state in which an energizing portion of the electric vehicle is placed in contact with respect to a power supplying portion of the external power supplying apparatus, wherein the electric vehicle travels on a trackless trajectory. In the electric vehicle, there are carried out a first charging control to charge the energy storage device by controlling a voltage converter so as to control an input current or an amount of change per unit time of the input current from the power supplying portion to the energy storage device, and a second charging control to charge the energy storage device with electrical power from the power supplying portion in which a converting operation of the voltage converter is stopped and voltage conversion is net carried out, or to charge the energy storage device by controlling the voltage converter on a basis of a target electrical power value which is a target value of electrical power supplied to the energy storage device. Furthermore, in the electric vehicle, the first charging control and the second charging control are implemented while a point of contact between the energizing portion and the power supplying portion is moved, the first charging control is implemented when the energizing portion comes into contact with the power supplying portion, and the second charging control is implemented after the first charging control. The power supplying portion is capable of initiating contact with the energizing portion and separating away therefrom at arbitrary positions, and when the energizing portion is placed in contact with the power supplying portion, under a condition in which a remaining capacity of the energy storage device is a predetermined value, and a vehicle speed of the electric vehicle or a movement speed of the power supplying portion is an assumed speed or lies within an assumed speed range, the first charging control and the second charging control are completed within a range that is shorter than half a total length of the power supplying portion, and together therewith, implementation time of the second charging control is longer than that of the first charging control.

DESCRIPTION OF EMBODIMENTS

I. Embodiment
1A. Configuration
[1A-1. Overall Configuration]

Figure 1:
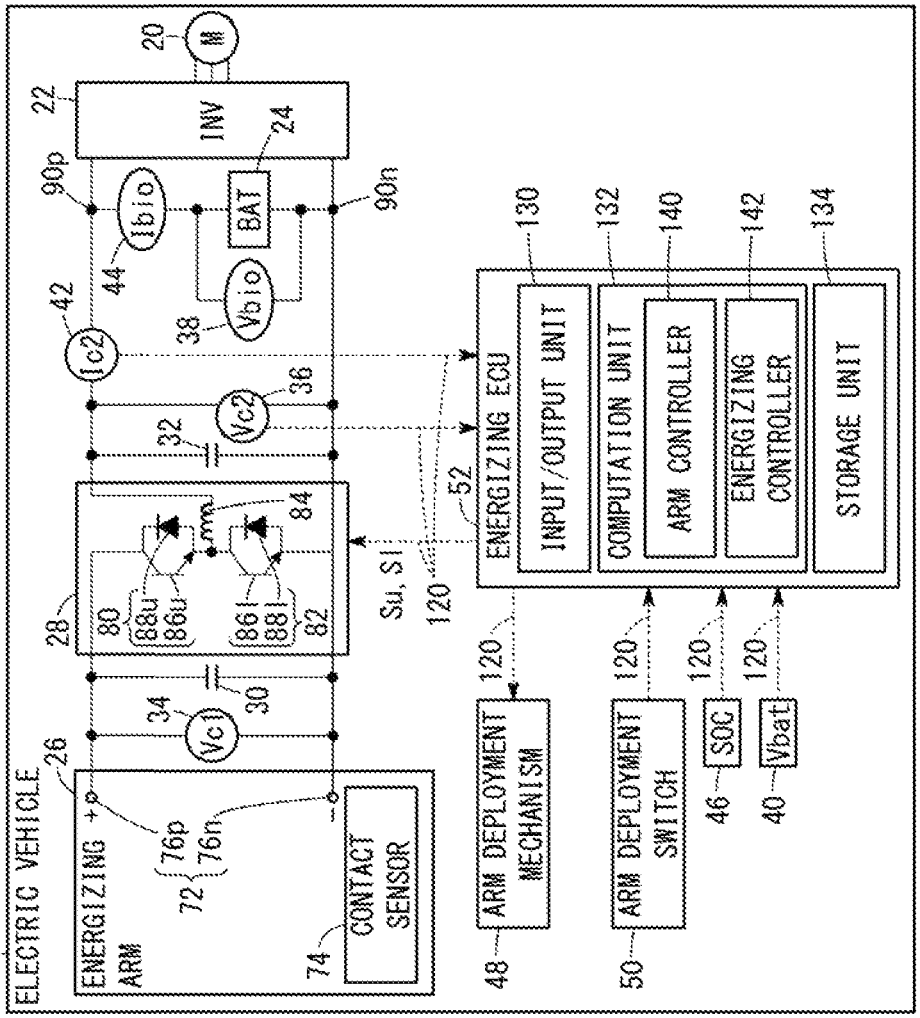
FIG. 1 is an outline schematic view of a charging system equipped with an electric vehicle according to an embodiment of the present invention.
Figure 2:
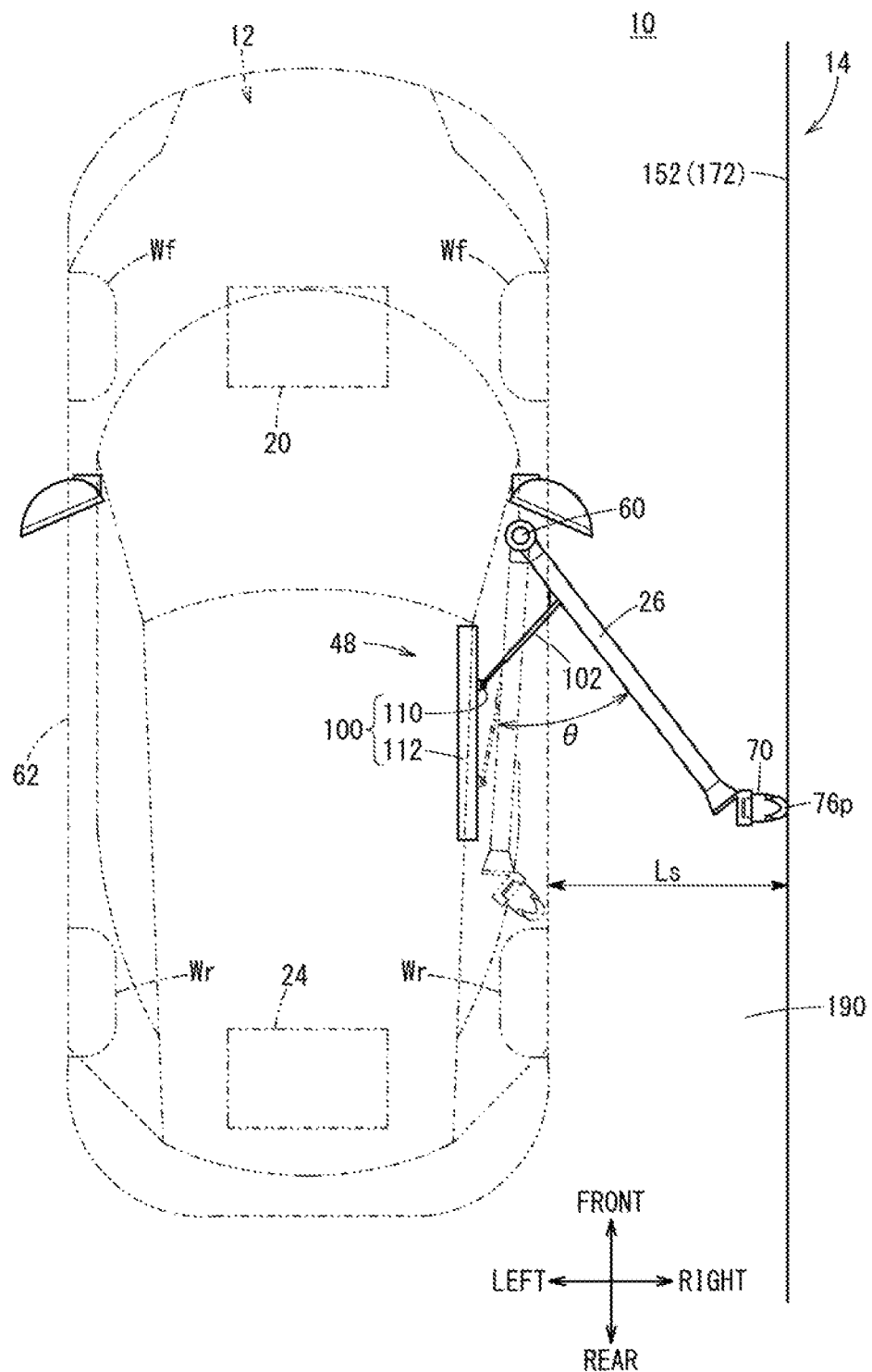
FIG. 2 is a plan view showing with emphasis portions of the charging system in the embodiment.
Figure 3:
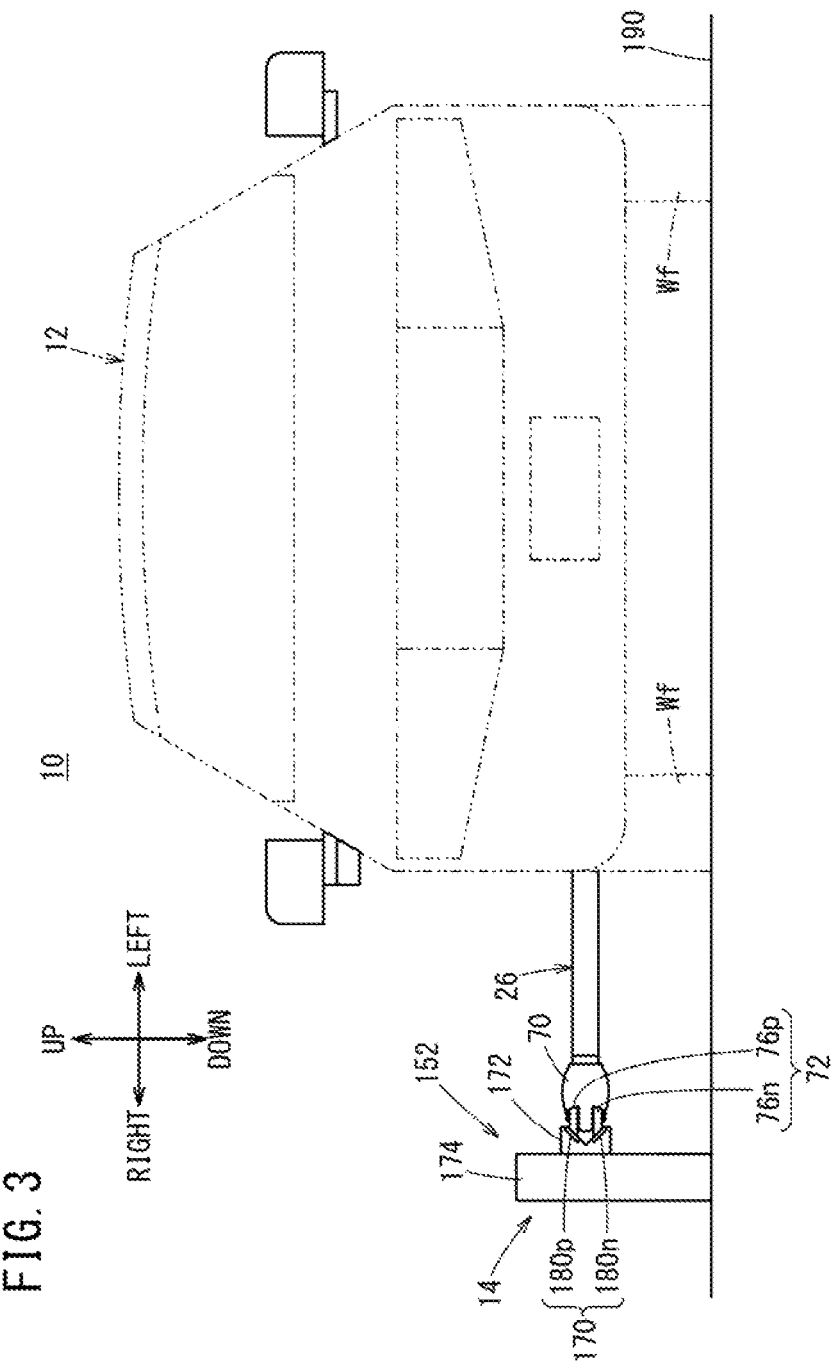
FIG. 3 is a front view showing with emphasis portions of the charging system in the embodiment.

FIG. 1 is an outline schematic view of a charging system 10 equipped with an electric vehicle 12 according to act embodiment of the present invention. FIG. 2 is a plan view showing with emphasis portions of the charging system 10. FIG. 3 is a front view showing with emphasis portions of the charging system 10. As shown in FIGS. 1 through 3, the charging system 10, in addition to the electric vehicle 12 (hereinafter also referred to as a "vehicle 12"), includes an external power supplying apparatus 14 (hereinafter also referred to as a "power supplying apparatus 14"). Any of the directions ("front", "rear", "left", "right", "up", "down") in FIGS. 2 and 3 are directions on the basis of the vehicle 12 (the same holds true for FIG. 4).

According to the present embodiment, electrical power is supplied to the vehicle 12 from the power supplying apparatus 14, and charging of a battery 24 (see FIG. 1) for traveling of the vehicle 12 is performed. Conversely, electrical power may be supplied from the vehicle 12 to an external device (power supplying apparatus 14, etc.).

[1A-2. Electric Vehicle 12]
(1A-2-1. Overall Configuration of Electric Vehicle 12)

As shown in FIGS. 1 through 3, the vehicle 12 includes a traction motor 20 (hereinafter also referred to as a "motor 20"), an inverter 22, a battery 24 for traveling (hereinafter also referred to as a "battery 24"), an energizing arm 26, a DC/DC converter 28, capacitors 30, 32, voltage sensors 34, 36, 38, 40, current sensors 42, 44, an SOC sensor 46, an arm deployment mechanism 48 (hereinafter also referred to as a "deployment mechanism 48"), an arm deployment swatch 50, and an energizing electronic control unit 52 (hereinafter referred to as an "energizing ECU 52" or an "ECU 52").

The vehicle 12 travels on a trackless trajectory. Stated otherwise, the electric vehicle 12 differs from one that travels on a track such as a railway vehicle or the like, and the trajectory of the vehicle 12 is capable of being freely changed.

(1A-2-2. Traction Motor 20)

The traction motor 20 is a 3-phase brushless type of motor, which generates a drive force F [N] (or a torque [N·m]) for the vehicle 12 on the basis of electrical power supplied from the battery 24 through the inverter 22. Further, the motor 20 carries out charging of the battery 24 by outputting to the battery 24 power (regenerative power Preg) [W] produced by performing a regenerative operation. The regenerative power Preg may also be output to a step-down converter, a low-voltage battery, and auxiliary devices, none of which are shown.

(1A-2-3. Inverter 22)

The inverter 22 is constituted as a 3-phase full-bridge type, which converts a DC current from the battery 24 into a 3-phase AC current and supplies the same to the motor 20, whereas accompanying a regenerative operation, supplies a DC current to the battery 24 following AC/DC conversion.

(1A-2-4. Battery 24)

The battery 24 is an energy storage device (energy storage) including a plurality of battery cells, and for example, a lithium ion secondary battery, a nickel-metal hydride battery, or the like, can be used therefore. Alternatively, in place of the battery 24 or in addition to the battery 24, an energy storage device such as a capacitor or the like can be used. A non-illustrated DC/DC converter nay be disposed between the inverter 22 and the battery 24, and an output voltage from the battery 24 or an output voltage from the motor 20 may be stepped-up or stepped-down in voltage.

(1A-2-5. Energizing Arm 26)

The energizing arm 25 (hereinafter also referred to as an "arm 26") is a site (energizing portion) that is placed in contact with the power supplying apparatus 14 when the battery 24 is charged with electrical power from the power supplying apparatus 14. As shown in FIG. 2, the energizing arm 26 is connected to a vehicle body 62 at a location between the front wheels Wf and the rear wheels Wr, with one end (fixed end) thereof being capable of rotating about an axis of rotation 60. Therefore, the energizing arm 26 is capable of being deployed (or displaced) transversely or laterally of the vehicle 12 (on the right side in the present embodiment) at a time of contact with the power supplying apparatus 14.

An energizing head 70 including a power receiving portion 72 (energizing portion) and a contact sensor 74 is provided on a distal end of the energizing arm 26. The power receiving portion 72 includes a positive electrode terminal 76p and a negative electrode terminal 76n. The positive electrode terminal 76p and the negative electrode terminal 76n are connected electrically with a fixed end side through non-illustrated conductive members. The positive electrode terminal 76p and the negative electrode terminal 76n of the present embodiment are shaped in the form of rollers (see FIGS. 2 and 3). The vehicle 12 and the power supplying apparatus 14 are connected electrically by the power receiving portion 72 being placed in contact with external power lines 170 (power supplying portion or power supplying lines) of the power supplying apparatus 14.

The contact sensor 74 serves to detect contact between the energizing head 70 and the external power supplying apparatus 14 (later described external power lines 170), and is constituted, for example, from a pressure sensor disposed on a portion of the energizing head 70. Alternatively, the contact sensor 74 may be constituted as a pressure sensor that is arranged between the power receiving portion 72 and the converter 28.

Concerning the principal structure of the energizing arm 26, for example, the structure disclosed in Japanese Laid-open Patent Publication No. 2013-233037 can be used.

(1A-2-6. DC/DC Converter 28)

The DC/DC converter 28 (hereinafter also referred to as a "converter 28" or a "vehicle side converter 28") converts an output voltage of the power supplying apparatus 14 (hereinafter referred to as an "output voltage Vs" or a "power supply voltage Vs") and outputs the same to the inverter 22 and the battery 24. In addition, the converter 28 is capable of converting the output voltage from the battery 24 and supplying the output voltage from the battery 24 to the exterior (for example, the external power supplying apparatus 14) through the power receiving portion 72.

The converter 28 of the present embodiment steps-down the power supply voltage Vs and outputs the same to the side of the vehicle 12, together with stepping-up the output voltage of the battery 24 and outputting the same to the exterior. However, the converter 28 may carry out only stepping-up of the power supply voltage Vs, or may carry-out both stepping-up and stepping-down in voltage thereof.

As shown in FIG. 1, the converter 28 includes an upper arm 80, a lower arm 82, and a reactor S4. The upper arm 80 includes a switching element 86u, and a diode 88u that is disposed in a reverse parallel manner therewith. The lower arm 82 includes a switching element 86l, and a diode 38l that is disposed in a reverse parallel manner therewith. As the switching elements 86u, 86l, there may be adopted power switching elements such as a MOSFET (including a SiC (silicon carbon) type of MOSFET) or an IGBT or the like.

The switching element 86u is switched by a drive signal Su supplied from the ECU 52, and the switching element 86l is switched by a drive signal Sl supplied from the ECU 52. The drive signals Su, Sl are PWM (pulse width modulated) signals.

In FIG. 1, although one each of the switching elements 86u, 86l is illustrated, a configuration may be provided in which a plurality of switching elements are arranged in parallel, respectively. Stated otherwise, a plurality of switching elements 86u, which are arranged in parallel, and a plurality of switching elements 86l, which are arranged in parallel, may be provided. Further, in the case that a plurality of switching elements 86u are used, one or a plurality thereamong may be SiC type MOSFETs, whereas the remaining ones may be constituted by IGBTs. In accordance therewith, the rate of passage of the current is increased by the SiC type MOSFETs, and passage of a large current can be facilitated by the IGBTs. Similarly, the diodes 88u, 88l also may be constituted from a plurality of diodes that are arranged in parallel.

(A-2-7. Capacitors 30, 32)

The capacitor 30 is arranged between the power receiving portion 72 of the arm 26 and the converter 28. The capacitor 32 is arranged between the converter 28 and branch points 90p, 90n. The capacitors 30, 32, for example, suppress voltage fluctuations by temporarily storing the electrical power from the power supplying apparatus 14.

(1A-2-8. Voltage Sensors 34, 36, 38, 40)

The voltage sensor 34 is arranged between the power receiving portion 72 and the DC/DC converter 23, and detects a voltage (hereinafter referred to as a "converter input voltage Vc1", "a converter primary voltage Vc1", or a "primary voltage Vc1") on a primary side (input side) of the DC/DC converter 28. The voltage sensor 36 is arranged between the DC/DC converter 28 and the branch points 90p, 90n, and detects a voltage (hereinafter referred to as a "converter output voltage Vc2", "a converter secondary voltage Vc2", or a "secondary voltage Vc2") on a secondary side (output side) of the DC/DC converter 28.

The voltage sensor 38 is arranged between the battery 24 and the branch points 90p, 90n, and detects an input/output voltage (hereinafter referred to as a "battery input/output voltage vbio", an "input/output voltage vbio", or a "voltage Vbio") of the battery 24. The voltage sensor 40 detects an inter-terminal voltage (hereinafter referred to as a "battery voltage vbat" or a "voltage Vbat") of the battery 24.

(1A-2-9. Current Sensors 42, 44)

The current sensor 42 is arranged between the DC/DC converter 28 and the branch point 90p, and detects a current (hereinafter referred to as a "converter output current Ic2", "a converter secondary current Ic2", or a "secondary current Ic2") on the secondary side of the DC/DC converter 28. The current sensor 44 is arranged between the battery 24 and the branch point 90p, and detects an input/output current (hereinafter referred to as a "battery input/output current Ibio", an "input/output current Ibio", or a "current Ibio") of the battery 24.

(1A-2-10. SOC Sensor 46)

The SOC sensor 46 detects a remaining capacity (SOC: State of Charge) of the battery 24 and outputs the same to the ECU 52.

(1A-2-11. Arm Deployment Mechanism 48 and Arm Deployment Switch 50)

The arm deployment mechanism 46 serves to deploy the arm 26, and as shown in FIG. 2, includes a slider unit 100 and a damper unit 102. The slider unit 100 includes a slider 110 and a slider support member 112. Based on a command from the ECU 52, the slider 110 is capable of sliding with respect to the slider support member 112. The slider 110, for example, is an electromagnetic or a pneumatic type of linear actuator.

One end (first end) of the damper unit 102 is connected rotatably to the slider 110, and another end (second end) thereof is connected rotatably to the arm 26. When the arm 26 is deployed, the slider 110 is displaced to the front side of the vehicle 12, and the first end of the damper unit 102 is displaced forward. When the arm 26 is housed, the slider 110 is displaced to the rear side of the vehicle 12, and the first end of the damper unit 102 is displaced rearward.

The arm deployment switch 50 (hereinafter also referred to as a "switch 50") serves to issue a command for deployment of the arm 26 in accordance with an operation from the user. The switch 50, for example, is formed on a portion of the steering wheel (not shown). When the switch 50 is turned on, the arm 26 is deployed through the deployment mechanism 48, and when the switch 50 is turned off, the arm 26 is accommodated through the deployment mechanism 48.

(1A-2-12. ECU 52)

The ECU 52 serves to control reception of inputs from respective components of the vehicle 12 or to control the respective components themselves through a vehicle side communications line 120 (see FIG. 1), and includes an input/output unit 130, a computation unit 132, and a storage unit 134. In the present embodiment, the computation unit 132 of the ECU 52 includes an arm controller 140 and an energizing controller 142. The arm controller 140 controls the energizing arm 26 through the arm deployment mechanism 48. The energizing controller 142 controls charging of the battery 24 or supply of power from the battery 24.

[1A-3. External Power Supplying Apparatus 14]

Figure 4:
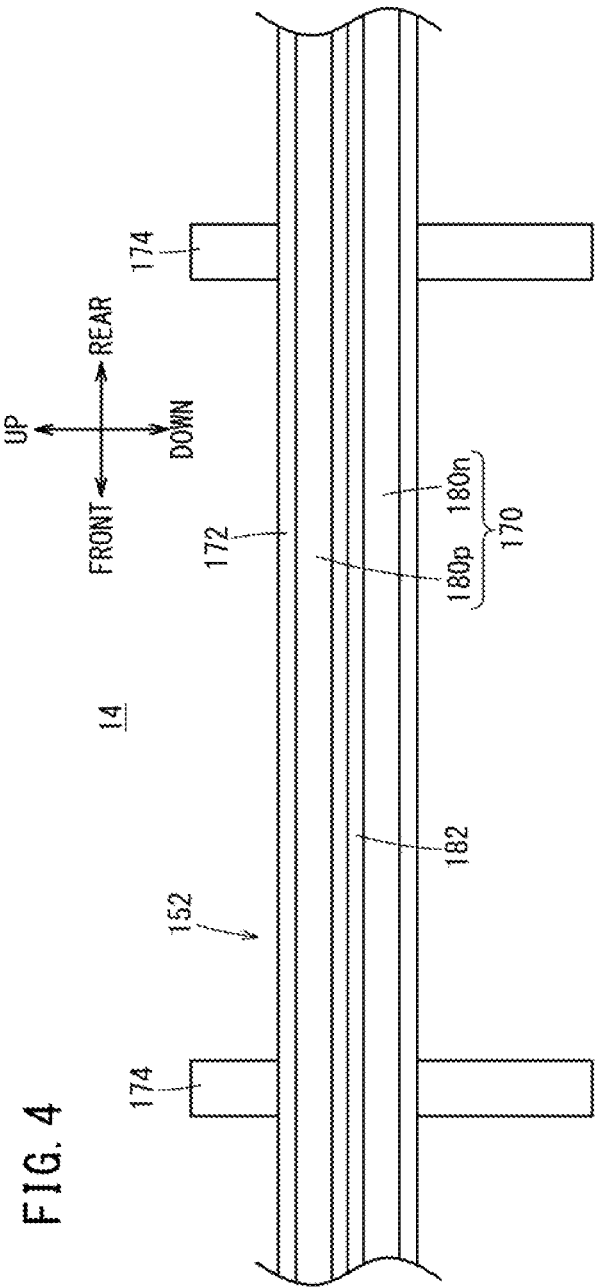
FIG. 4 is an external view showing schematically a portion of an external power supplying apparatus in the embodiment.

FIG. 4 is an external view showing schematically a portion of the external power supplying apparatus 14. As shown in FIGS. 1 through 4, the power supplying apparatus 14 includes a DC power source 150, a contact-type power supplying portion 152, a DC/DC converter 154 (hereinafter also referred to as a "converter 154" or an "external converter 154"), a diode 156, a voltage sensor 158, an input device 160, and a control device 162. Hereinafter, the DC power source 150, the converter 154, the diode 156, the voltage sensor 158, the input device 160, and the control, device 162 may also be referred to collectively as a voltage applying unit 164. The voltage applying unit 164 is a site that applies a voltage with respect to the contact-type power supplying portion 152.

(1A-3-1. DC Power Source 150)

The DC power source 150 (hereinafter also referred to as a "power source 150") supplies electrical power with respect to the vehicle 12. The power source 150 of the present embodiment is constituted, for example, by connecting a plurality of batteries together in series. Alternatively, the power source 150 may be constituted from a single battery. Alternatively, the power source 150 can be constituted from a combination of a commercial AC power source and an AC/DC converter (not shown).

(1A-3-2. Contact-Type Power Supplying Portion 152)
(1A-3-2-1. Overall Configuration of Contact-Type Power Supplying Portion 152)

The contact-type power supplying portion 152 (hereinafter also referred to as a "power supplying portion 152") is a site, which by being placed in contact with the arm 26 of the vehicle 12, supplies electrical power from the power source 150 to the side of the vehicle 12. As shown in FIGS. 1 through 4, the contact-type power supplying portion 152 of the present embodiment includes the external power lines 170 (hereinafter also referred to as "power lines 170"), a power line retaining section 172, and a plurality of support posts 174.

(1A-3-2-2. External Power Lines 170)

The external power lines 170 comprise a positive electrode terminal 180p and a negative electrode terminal 180n. As shown in FIGS. 3 and 4, the positive electrode terminal 180p and the negative electrode terminal 130n are formed in the interior of a groove member 182 that is formed in the power line retaining section 172. Therefore, the external power lines 170 are constituted as aerial power lines that are disposed above a travel path 190 (see FIGS. 2 and 3). Further, as shown in FIG. 2, the positive electrode terminal 180p and the negative electrode terminal 180n are arranged to the side of the travel path 190 along the travel path ISO of the vehicle 12. In particular, the positive electrode terminal 180p and the negative electrode terminal 180n are disposed in the form of a straight line. The length (total length) of the positive electrode terminal 180p and the negative electrode terminal 180n in the direction of travel of the vehicle 12 can be set to any value, for example, within a range of 20 to 300 m.

(1A-3-2-3. Power Line Retaining Section 172 and Support Posts 174)

As discussed above, the power line retaining section 172 retains external power lines 170 in the groove member 182 thereof. The support posts 174 are disposed vertically on the side of the travel path 190, and support the external power lines 170 and the power line retaining section 172.

(1A-3-3. External Converter 154)

The external converter 154 converts the input voltage (power source voltage Vcc) from the power source 150, and outputs the same to the external power lines 170. The converter 154 is a step-up/step-down type converter. Alternatively, depending on the power source voltage Vcc, the converter 154 can be a step-up or a step-down type of converter.

The conversion ratio of the converter 154 is controlled by the control device 162. More specifically, the duty ratios of drive signals Sd with respect to the converter 154 is adjusted, whereby the power supply voltage Vs is controlled by converting the power source voltage Vcc. The power source voltage Vcc according to the present embodiment is a comparatively high voltage, and the converter 154 produces the power supply voltages Vs by stepping-down the power source voltage Vcc, Alternatively, the converter 154 may carry out only stepping-up of the power source voltage Vcc, or may carry out both stepping-up and stepping-down in voltage thereof. After the power supply voltage Vs has reached the target value, the control device 162 maintains the power supply voltage Vs at a constant value.

(1A-3-4. Diode 156)

The diode 156 is arranged between the converter 154 and the positive electrode terminal 180p, and serves to prevent flowing of current from the vehicle 12 to the side of the power supplying apparatus 14.

(1A-3-5. Voltage Sensor 158)

The voltage sensor 158 is disposed on a secondary side (output side) of the DC/DC converter 154, detects the output voltage Vs of the converter 154, and outputs information thereof to the control device 162.

(1A-3-6. Input Device 160)

The input device 160 serves to input to the control device 162 commands from an administrator of the power supplying apparatus 14. The input device 160 can be constituted, for example, from a plurality of operation buttons, and in input means such as a keyboard or the like.

(1A-3-7. Control Device 162)

The control device 162 serves to control the power supplying apparatus 14 as a whole, and according to the present embodiment, primarily controls the external converter 154.

1B. Various Types of Control

[1B-1. Overview]

Next, a description will be presented concerning various controls when electrical power is supplied to the vehicle 12 from the power supplying apparatus 14, and charging of the battery 24 of the vehicle 12 is performed. The controls include an energizing arm control and a charging control.

The energizing arm control is a control for the energizing arm 26 prior to charging, during charging, and after charging of the battery 24, which is implemented by the arm controller 140 of the ECU 52. The charging control is a control for carrying out charging of the battery 24 of the vehicle 12. In the charging control, there are included a power supplying control implemented by the control device 162 of the power supplying apparatus 14, and a power receiving control implemented by the energizing controller 142 of the ECU 52 of the vehicle 12.

[1B-2. Energizing Arm Control]

Figure 5:
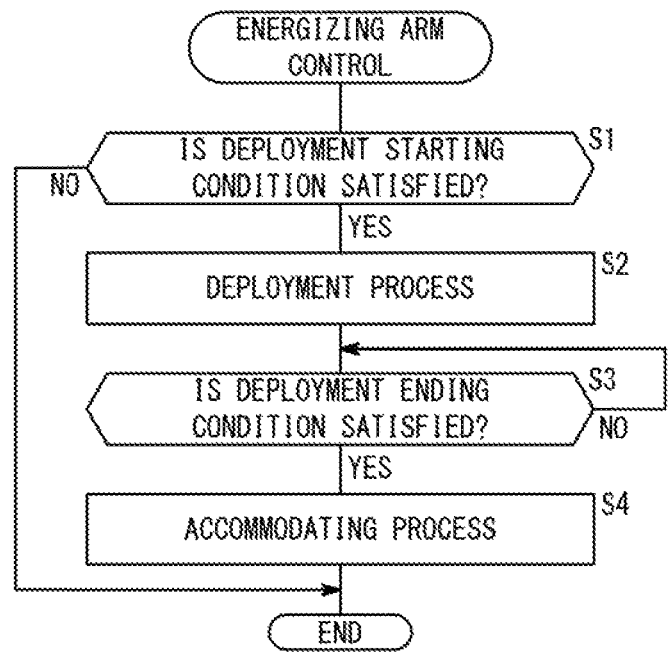
FIG. 5 is a flowchart of an energizing arm control in the embodiment.

FIG. 5 is a flowchart of the energizing arm control according to the present embodiment. In step S1, the ECU 52 determines whether or not a deployment starting condition for the energizing arm 26 has been satisfied. As such a deployment starting condition, there can be cited, for example, that the deployment switch 50 has been turned on. In addition to or in place thereof, the fact that a distance (distance in the direction of travel) between the vehicle 12 and the contact-type power supplying portion 152 in the direction of travel of the vehicle 12 is less than or equal to a predetermined threshold value (distance threshold value) may serve as a deployment starting condition. In order to determine the distance in the direction of travel, for example, there may be provided beforehand in the vehicle 12 a non-illustrated present position detecting device (for example, a navigation device), and a nap database in which position information of the power supplying apparatus 34 (contact-type power supplying portion 152) is stored. In addition, the distance in the direction of travel can be calculated as a distance between the present position of the vehicle 12 and the position of the contact-type power supplying portion 152.

Alternatively, it is possible to provide communications devices for short-range communications, respectively, in the vehicle 12 and the power supplying apparatus 14, and it can be judged that the deployment starting condition is satisfied when communications between both communications devices are established.

In the case that the deployment starting condition is not satisfied (step S1: NO), then the current process is terminated, and the procedure is started again from step Si after elapse of a predetermined time period. In the case that the deployment starting condition is satisfied (step S1: YES), then the routine proceeds to step S2.

In step S2, the ECU 52 implements a deployment process for deploying the arm 26, which is in an accommodated state. By the deployment process, the arm 26 is displaced to a position where it projects out maximally from the vehicle body 62 of the vehicle 12. In this state, a distance Ls (see FIG. 2) between the vehicle 12 and the contact-type power supplying portion 152 is adjusted by the driver steering the vehicle 12, whereby the arm 26 approaches toward the external power lines 170.

In step S3, the ECU 52 determines whether or not a deployment ending condition for the energizing arm 26 has been satisfied. As such a deployment ending condition, there can be cited, for example, that the deployment switch 50 has been turned off.

In addition to or in place thereof, completion of charging of the battery 24 may be used as the deployment ending condition. Completion of charging can be determined by the SOC having reached a predetermined threshold value (SOC threshold value), or by the battery voltage Vbat having reached a predetermined threshold value (battery voltage threshold value).

Alternatively, it is possible to provide communications devices for short-range communications, respectively, in the vehicle 12 and the power supplying apparatus 14, and after communications between both communications devices has been established, it can be judged that the deployment ending condition is satisfied when communications are cut off.

If the deployment ending condition has not been satisfied (step S3: NO), then step S3 is repeated. In the case that the deployment ending condition is satisfied (step S3: YES), then in step S4, the ECU 52 implements an accommodating process for accommodating the energizing arm 26, which is in the deployed condition. Upon completion of the accommodating process, the procedure is started again from step SI after elapse of a predetermined time period.

[1B-3. Power Supplying Control of External Power Supplying Apparatus 14]

The control device 162 of the external power supplying apparatus 14 places the external power lines 170 in a power supplying capable state, on the basis of a command from an administrator that is input through the input device 160. More specifically, the control device 162 outputs drive signals Sd (see FIG. 1) intermittently or continuously to the switching element (not shown) of the external converter 154, thereby connecting the power source 150 and the power lines 170. Consequently, the power lines 170 are placed in a power supply enabling state. In addition, when the power receiving portion 72 of the arm 26 comes into contact with the power lines 170, supply of power from the power supplying apparatus 14 to the vehicle 12 is carried out through the power lines 170.

[1B-4. Power Receiving Control of Vehicle 12]
(1B-4-1. Overall Process Flow of Power Receiving Control)

Figure 6:
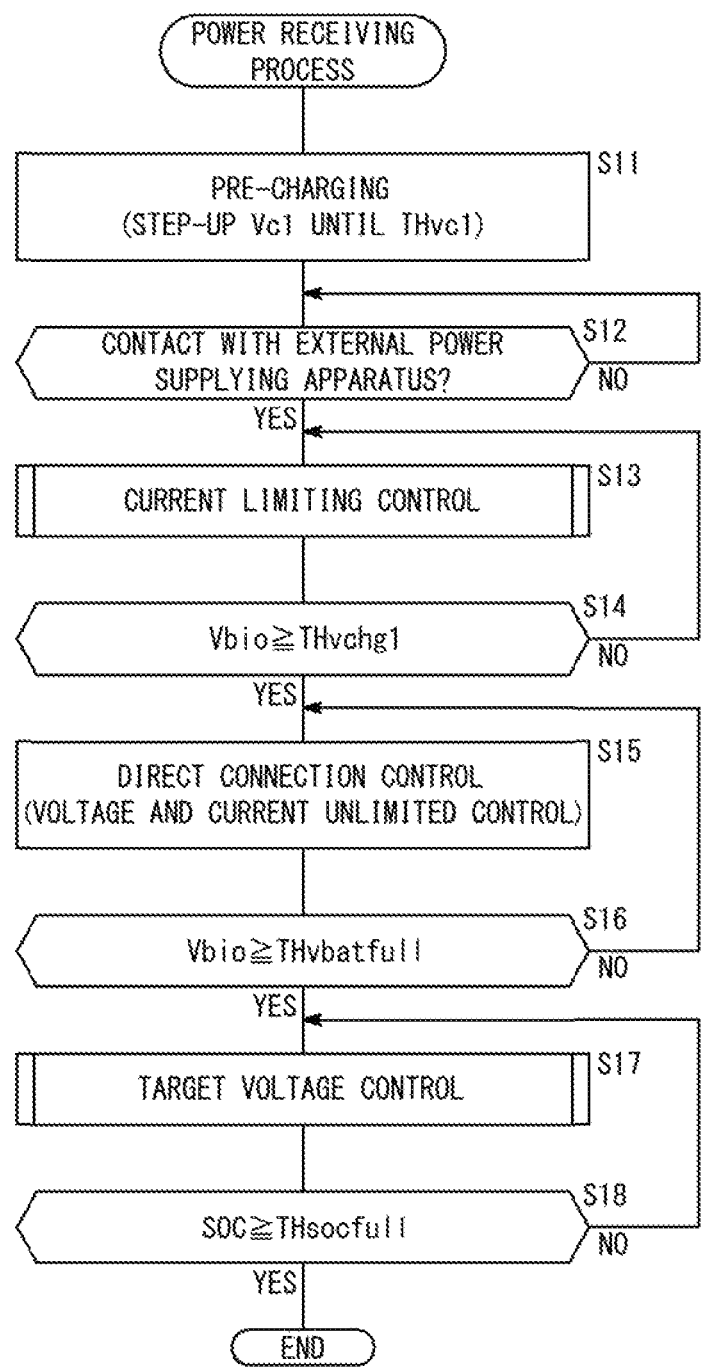
FIG. 6 is a flowchart of a power receiving control by the electric vehicle in the embodiment.
Figure 7:
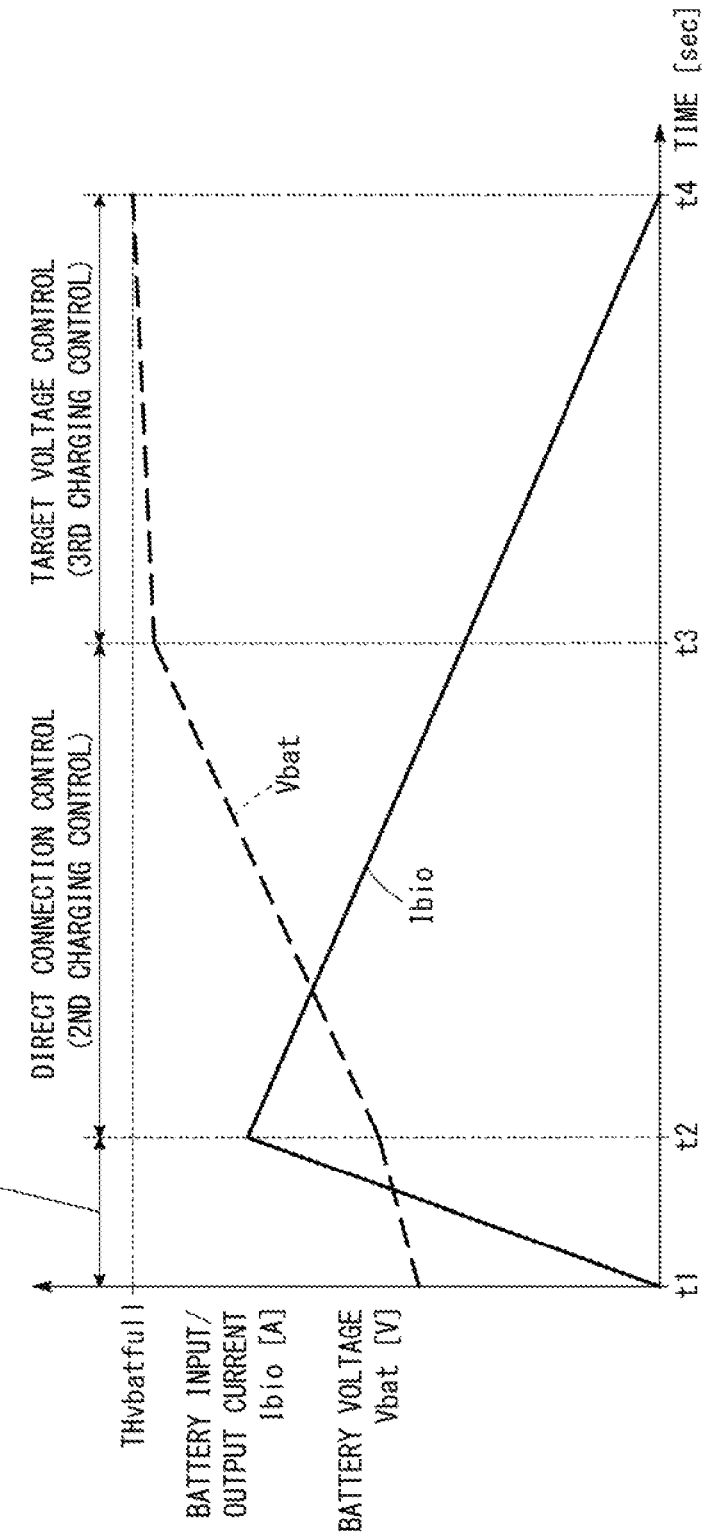
FIG. 7 is a view showing an example of an inter-terminal voltage of a battery and an input/output current in the case that the process of the flowchart of FIG. 6 is carried out.

FIG. 6 is a flowchart of a power receiving control of the vehicle 12 according to the present embodiment. FIG. 7 is a view showing an example of the inter-terminal voltage Vbat and the input/output current Ibio of the battery 24 in the case that the process of the flowchart of FIG. 6 is carried Gut. The control of FIG. 6 is carried out when the arm 26 is deployed. For example, the ECU 52 initiates the power receiving control with pressing of the deployment switch 50 being treated as a triggering event.

In step S11 of FIG. 6, the ECU 52 carries out a precharging process for raising the primary voltage Vc1 of the converter 28 up to a threshold value (primary voltage threshold value THvc1). More specifically, the ECU 52 turns on the switching element 86$l$ in a state in which the switching element 86$u$ is turned off, and accumulates in the reactor 84 electrical power from the battery 24. Thereafter, the ECU 52 turns on the switching element 86$u$ in a state in which the switching element 86$l$ is turned off, and charges the capacitor 30 to raise the primary voltage Vc1.

In step S12, the ECU 52 determines whether or not the power receiving portion 72 of the arm 26 has been placed in contact with the power supplying portion 152 of the power supplying apparatus 14. Such a determination is carried out based on the output from the contact sensor 74.

If the power receiving portion 72 is not in contact with the power supplying portion 152 (step S12: NO), step 312 is repeated. If the power receiving portion 72 is in contact with the power supplying portion 152 (step S12: YES), then the routine proceeds to step S13.

In step S13, the ECU 52 implements (at times t1 to t2 of FIG. 7) the current limiting control for limiting the input/output current Ibio (in this case particularly, the input current) to the battery 24. The current limiting control will be described later with reference to FIG. 8.

In step S14, the ECU 52 determines whether or net the battery input/output voltage Vbio (in this case particularly, an input voltage (charging voltage)) has become greater than or equal to a threshold value (hereinafter referred to as a "first charging voltage threshold value THvchg1" or a "first threshold value THvchg1"). The threshold voltage THvchg1 is a threshold value for determining whether or not a voltage difference between the output voltage Vs from the power supplying apparatus 14 and the voltage (primary voltage Vc1) on the side of the vehicle 12 has become sufficiently small to reduce the inrush current to the vehicle 12 from the power supplying apparatus 14. The threshold value THvchg1 is set to a value that is lower than a fully charged voltage THvbatfull of the battery 24.

With such a determination, it should be borne in mind that the input direction to the battery 24 is made positive, the output direction from the battery 24 is made negative, and it is also possible to define the negative and positive values oppositely (the same holds true for other determinations). If the voltage Vbio is less than the threshold value THvchg1 (step S14: NO), step S13 is returned to, and the current limiting control is continued. If the voltage Vbio is greater than or equal to the threshold value THvchg1 (step S14: YES), then the current limiting control is brought to an end, and the routine proceeds to step S15.

In the determination of step S14, instead of comparing the battery input/output voltage Vbio and the threshold value THvchg1, the battery input/output current Ibio may be compared with a threshold value therefore (an input current threshold value THichg1). The current threshold value THichg1 is a threshold value for ensuring that the current that is input to the battery 24 (the current Ibio or the current Ic2) does not become an inrush current.

In step S15, the ECU 52 stops the converting operation by the converter 28, and implements a direct connection control for directly supplying electrical power from the power supplying apparatus 14 to the battery 24, etc. (at times t2 to t3 of FIG. 7). In this case, the ECU 52 continuously outputs (i.e., at a duty ratio of 100%) a drive signal Su with respect to the switching element 86u of the converter 28. The direct connection control is a control (voltage and current unlimited control) in which a combination of the battery input/output voltage Vbio and the battery input/output current Ibio (or a combination of the output voltage Vc2 and the output current Ic2 of the converter 28) is not treated as a direct control object.

With the direct connection control, the output voltage Vs of the power supplying portion 152 is applied to the battery 24 in the absence of the converting operation of the converter 28. Along therewith, the battery voltage Vbat rises gradually, whereas the battery input/output current Ibio decreases (at times t2 to t3 of FIG. 7).

In step S16, the ECU 52 determines whether or not the voltage Vbio has become greater than or equal to the fully charged voltage THvbatfull of the battery 24. If the voltage Vbio is less than the fully charged voltage THvbatfull (step S16: NO), step S15 is returned to, and the direct connection control is continued. If the voltage vbio is greater than or equal to the fully charged voltage THvbatfull (step S16: YES), then the direct connection control is brought to an end, and the routine proceeds to step S17.

In step S17, the ECU 52 implements a target voltage control for matching the battery input/output voltage Vbio with a target value (hereinafter referred to as a "target voltage Vbiotar") (at times t3 to t4 of FIG. 7). with the target voltage control, the target voltage Vbiotar is set to the fully charged voltage THvbatfull of the battery 24. More specifically, the ECU 52 sets a duty ratio of the converter 28 so that the voltage Vbio after being converted by the converter 28 becomes the fully charged voltage THvbatfull. Owing thereto, the battery voltage vbat rises gently toward the fully charged voltage THvbatfull, whereas the battery input/output current Ibio decreases (at times t3 to t4 of FIG. 7).

In step S18, the ECU 52 determines whether or not the SOC of the battery 24 has become greater than or equal to a threshold value (hereinafter referred to as a "fully charged threshold value THsocfull" or a "threshold value THsocfull"). The threshold value THsocfull is a threshold value for SOC, indicative of the fact that the battery 24 is in a fully charged state. In step S18, instead of comparing the SOC with a threshold value, the voltage Vbio may he compared with the fully charged voltage THvbatfull. If the SOC is not greater than or equal to the threshold value THsocfull (step S18: NO), step S17 is returned to, and the target voltage control is continued. If the SOC is greater than or equal to the threshold value THsocfull (step S18: YES), then the ECU 52 terminates the target voltage control and the current process is brought to an end.

(1B-4-2. Current Limiting Control)

Figure 8:
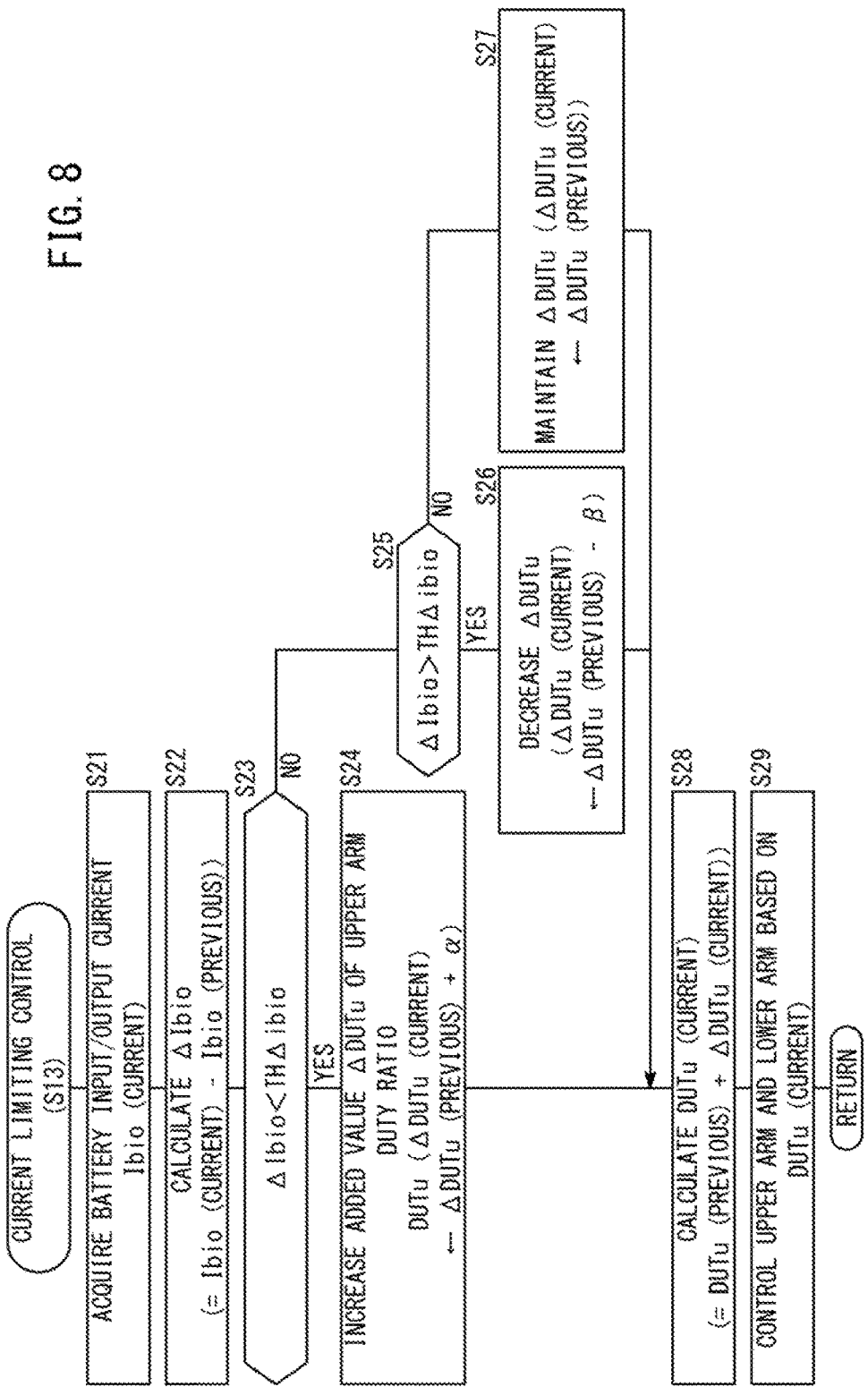
FIG. 8 is a flowchart of a current limiting control (details of step S13 of FIG. 6)

FIG. 8 is a flowchart of the current limiting control (details of step S13 of FIG. 6). According to the present embodiment, the implementation time of the current limiting control is significantly shorter than the implementation time of the direct connection control. Owing thereto, it is possible to realize ultra-high-speed charging of the vehicle 12. The temporal relationship between the current limiting control and the direct connection control will be described in detail later. Hereinbelow, the parenthetical term "(current)" will be used to denote values in the current computation cycle, and the parenthetical term "(previous)" will be used to denote values in the previous computation cycle.

In step S21 of FIG. 8, the ECU 52 acquires the battery input/output current Ibio (current).

In step S22, the ECU 52 calculates a current difference ΔIbio. The current difference ΔIbio is a difference between the battery input/output current Ibio (current) and the battery input/output current Ibio (previous).

In step S23, the ECU 52 determines whether or not the current difference ΔIbio fails below a threshold value (hereinafter also referred to as a "current difference threshold value THΔibio" or a "threshold value THΔibio"). The threshold value THΔibio is a threshold value for ensuring that the current that is input to the battery 24 (the current Ibio or the current Ic2) does not become an inrush current.

In the present embodiment, the threshold value THΔibio is set to a value corresponding to 10 to 100 times (for example, 60 times or more) the discharge capacity Wb [Ah] as a specification of the battery 24. For example, if the discharge capacity Wb of the battery 24 is 2 [Ah], the threshold value THΔibio is set to a value to realize 20 to 200 [Ah]. The threshold value THΔibio is set depending on the computation cycle performed according to the flowchart of FIG. 8.

If the current difference ΔIbio falls below the threshold value THΔibio (step S23: YES), the rate of increase of the current Ibio has room to rise to a value equivalent to the threshold value THΔibio. Thus, in step S24, the ECU52 increases an added value ΔDUTu of the duty ratio DUTu of the upper arm 80. More specifically, a positive fixed value α is added to the added value ΔDUTu (previous) of the duty ratio DUTu in order to arrive at the added value ΔDUTu (current). Subsequently, in step S28, the ECU 52 calculates the duty ratio DUTu (current) by adding the added value ΔDUTu (current) to the duty ratio DUTu (previous).

In step S23, if the current difference ΔIbio does not fall below the threshold value THΔibio (step S23: NO), then in step S25, the ECU 52 determines whether or not the current difference ΔIbio exceeds the threshold value THΔibio. The threshold value in step S25 may be a different value that is greater than the threshold value in step S23. If the current difference ΔIbio exceeds the threshold value THΔibio (step S25: YES), the current Ibio is increasing abruptly more than necessary. Thus, in step S26, the ECU52 decreases an added value ΔDUTu of the duty ratio DUTu of the upper arm 80. More specifically, a positive fixed value β is subtracted from the added value ≠DUTu (previous) of the duty ratio DUTu in order to arrive at the added value ΔDUTu (current).

On the other hand, if the current difference ΔIbio does not exceed the threshold value THΔibio (step S25: NO), the current difference ΔIbio is equivalent to the threshold value THΔibio, and the rate of increase of the current Ibio is appropriate. Thus, in step S27, the ECU 52 maintains the added value ΔDUTu. More specifically, the added value ΔDUTu (previous) is set to the added value ΔDUTu (current) without change. After steps S26 and S27 as well, in step S28, the ECU 52 calculates the duty ratio DUTu (current) by adding the added value ΔDUTu (current) to the duty ratio DUTu (previous).

Subsequently, in step S29, the ECU 52 controls the upper arm 80 and the lower arm 82 on the basis of the duty ratio DUTu (current). Specifically, the drive signal Su in accordance with the duty ratio DUTu is output with respect to the switching element 86*u* of the upper arm 80. Further, the value 100%−DUTu is calculated as the duty ratio DUTl (DUTl=100−DUTu) of the switching element 86*l*, and the drive signal Sl in accordance with the duty ratio DUTl is output with respect to the switching element 86*l* of the lower arm 82. However, a dead time is included between the drive signals Su, Sl of both switching elements 86*u*, 86*l*.

(1B-4-3. Target Voltage Control)

Figure 9:
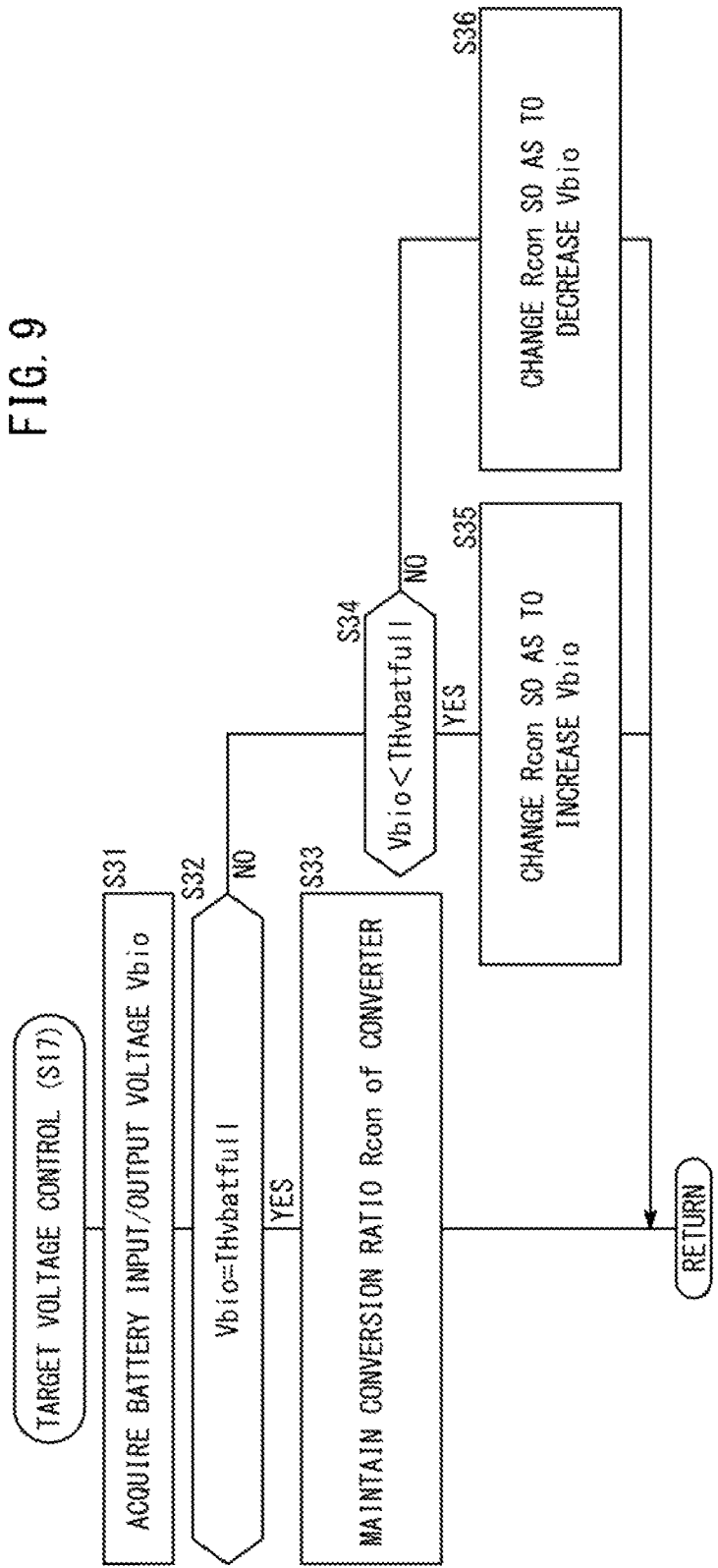
FIG. 9 is a flowchart of a target voltage control (details of step S17 of FIG. 6)

FIG. 9 is a flowchart of the target voltage control (details of step S17 of FIG. 6). In step S31, the ECU 52 acquires from the voltage sensor 38 the battery input/output voltage Vbio in the current computation cycle (control cycle). In step S32, the ECU 52 determines whether or not the voltage Vbio is equal to the fully charged voltage THvbatfull of the battery 24. If the voltage Vbio equals the fully charged voltage THvbatfull (step S32: YES), then in step S33, the ECU 52 maintains the conversion ratio Rcon of the converter 28. If the voltage Vbio is not equal to the fully charged voltage THvbatfull (step S32: NO), the routine proceeds to step S34.

In step S34, the ECU 52 determines whether or not the fully voltage Vbio falls below the fully charged voltage THvbatfull. If the voltage Vbio falls below the fully charged voltage THvbatfull (step S34: YES), then in step S35, the ECU 52 changes the conversion ratio Rcon of the converter 28 so as to increase the input/output voltage Vbio. For example, in the case of a step-down in voltage, when the duty ratio DUTu of the switching element 86*u* of the upper arm 80 is made greater, the voltage step-down ratio becomes smaller, and when the duty ratio DUTu is made smaller, the voltage step-down ratio becomes greater.

If the voltage Vbio does not fall below the fully charged voltage THvbatfull (step S34: NO), the voltage Vbio exceeds the fully charged voltage THvbatfull (Vbio>THvbatfull). In this case, in step S36, the ECU 52 changes the conversion ratio Rcon of the converter 28 so as to decrease the input/output voltage Vbio.

(1B-4-4. Temporal Relationship Between Current Limiting Control, and Direct. Connection Control)

Below, a description will be given of the temporal relationship between the current limiting control and the direct connection control. As noted above, according to the present embodiment, the implementation time of the current limiting control is significantly shorter than the implementation time of the direct connection control, whereby ultra-high-speed charging of the vehicle 12 can be realized.

(1B-4-4-1. Basic Concept)

According to the present embodiment, the vehicle 12 travels on a trackless trajectory. Therefore, compared with a vehicle that travels on a track such as a railway vehicle, a high degree of freedom exists for the initial contact position and the separation position after contact with the external power lines 170. Zn the case of a vehicle that travels on a track, the initial contact position and the separation position after contact with the external power lines 170 basically are the same. In contrast thereto, in an electric vehicle that travels on a trackless trajectory such as the vehicle 12, it is preferable to entrust the initial contact position and the separation position to the intention of the driver. In the event that the travel path 190 is made up from multiple lanes and plural electric vehicles travel along the same travel path 190, such a tendency becomes stronger. In particular, in a scenario where auto racing is held, such a tendency is even more remarkable.

Thus, according to the present embodiment, by forming the external power lines 170 inside of a groove member 182 that is continuous along the travel path 190, it is possible for the energizing head 70 to come into contact with and separate away at any position of the external power lines 170.

Additionally, according to the present embodiment, the implementation time of the current limiting control (first charging control) is shortened insofar as possible, whereas the implementation time of the direct connection control (second charging control) is made as long as possible. When considered from another point of view, by shortening the implementation time (absolute value) of the current limiting control, the relative time ratio of the implementation time of the direct connection control also is reduced.

(1B-4-4-2. Correspondence on the Side of the External Power Supplying Apparatus 14)

Since the implementation time of the current limiting control is shortened insofar as possible, and the implementation time of the direct connection control is made as long as possible, with the power supplying apparatus 14, at first, the discharge capacity of the DC power source 150 is comparatively high. In addition, since in the direct connection control, in order to perform charging with high efficiency while avoiding power losses by the converter 28 (switching losses, etc.), the power supply voltage Vs is set to a value equivalent to the full charged voltage THvbatfull of the battery 24 or within a margin thereof (a value in consideration of a voltage drop or the like).

Furthermore, concerning the total length Lip (length) of the external power lines 170, in the case that the SOC of the battery 24 is a predetermined value (e.g., a fixed value of anywhere from 0% to 30%), and in a state in which the vehicle 12 is traveling at an assumed speed (e.g., any value from 20 to 150 km/h) (or within an expected range of speeds), in the case that contact occurs from a near end of the external power lines 170 to an end on the far side thereof, the total length Lip (length) is set so that the current limiting control is carried out within a range that is shorter than half the length of the power lines 170.

For example, if the SOC of the battery 24 is a value in the vicinity of 0% and contact with the external power lines 170 occurs in a state with the vehicle 12 traveling at an assumed speed, the current limiting control is completed at a contact length of 1 to 10 m, whereas the direct connection control is completed at a contact length of 19 to 150 m. As a result, the implementation time (absolute value) of the current limiting control is extremely short, and the relative time ratio of the implementation time of the direct connection control is significantly reduced.

In addition, the current limiting control and direct connection control are completed even without contact with the power lines 170 over the entire length Lip of the external power lines 170. For example, it is possible for the current limiting control and the direct connection control to be completed by being in contact at half the total length Llp or less.

(1B-4-4-3. Correspondence with Side of Electric Vehicle 12)

In order to shorten the implementation time of the current limiting control insofar as possible, and in order to make the implementation time of the direct connection control as long as possible, on the side of the electric vehicle 12, the threshold value THΔibio of the current difference ΔIbio (rate of increase of the current Ibio) (steps S23, S25 of FIG. 8) in the current limiting control (step S13 of FIG. 6, FIG. 8) is set to a value corresponding to 10 to 100 times the discharge capacity Wb of the battery 24 (for example, 60 times or greater). At this time, in order to realize the threshold value THΔibio, concerning the switching elements 86*u*, 86*l* (or at least the switching element 86*u*), switching elements (for example, SiC type MOSFETs) preferably are used for which the rate of passage of the current is rapid.

In addition, the direct connection control is used as a control that follows the current limiting control (however, as will be described later, it is possible for a different control to be used). By this feature, power losses within the converter 28 are avoided, and the charging time of the battery 24 can be shortened.

1C. Advantages of the Present Embodiment

According to the present invention, when the energizing arm 26 (energizing portion) contacts the external power lines 170 (power supplying portion or power supplying lines), the current limiting control (first charging control) is carried out in which the input current (input/output current Ibio) to the battery 24 (energy storage device) is treated as the control object (step S13 of FIG. 6, FIG. 8). Owing thereto, an instantaneous surge current at the time chat energizing is started can be prevented, and welding or fusion between the external power lines 170 and the energizing arm 26, or damage to the electrical circuitry on the side of the external power lines 170 or on the side of the energizing arm 26 can be prevented. Further, after the current limiting control, the direct connection control (second charging control), in which supply of power without voltage conversion is performed, is carried out for a longer time period than the current limiting control (step S15 of FIG. 6, FIG. 7). Accordingly, charging over an extremely short time is enabled by a combination of the current limiting control and the direct connection control.

Furthermore, under a control environment ranging from the current limiting control to the direct connection control, by bringing the external power lines 170 and the energizing arm 26 into contact while the contact point therebetween is moved, generation of heat at the contact point is not concentrated in one location. Owing thereto, even if high current energizing is carried out in the direct connection control, which is performed longer than the current limiting control, welding or fusion between the external power lines 170 and the energizing arm 26, or damage to the electrical circuitry on the side of the external power lines 170 or on the side of the energizing Bin 26 can be prevented.

Further still, because charging can be performed in an extremely short time period by the current limiting control and the direct connection control, charging of the battery 24 (energy storage device) can be carried out reliably, even in situations that have been problematic in the case of traveling on a trackless trajectory, in which, according to the driver's intention, the contact position with the external power lines 170 and the separation position from the external power lines 170 are changed, and further, in which the charging time period is unpredictable due to the power supplying section, which is defined by the external power lines 170, being traveled through at high speed.

In addition, since charging can be performed in an extremely short time period, the installation distance (total length of the external power lines 170) between and the number of power supplying sections can be kept to a minimum, and investment costs in infrastructure can be reduced.

When the battery input/output voltage Vbio (or the output voltage Vc2 of the converter 28 (voltage converter)) during the direct connection control (second charging control) arrives at a fully charged voltage THvbatfull of the battery 24 (step S16 of FIG. 6: YES), the ECU 52 (control device) implements the target voltage control (third charging control) for operating the converter 28 so as to maintain the voltage vbio at the fully charged voltage THvbatfull (step S17 of FIG. 6, FIG. 9). Owing thereto, the battery 24 can be fully charged more reliably.

In the present embodiment, the positive electrode terminal 76$p$ and the negative electrode terminal 76$n$ in the form of rollers that contact the external power lines 170 (power supplying portion or power supplying lines) are formed on the distal end of the energizing arm 26 (see FIGS. 2 and 3). By this feature, damage to the power receiving portion 72 as a contact site of the energizing arm 26 with respect to the external power lines 170 can be lightened or alleviated.

In the present embodiment, the electric vehicle 12 is equipped with the arm deployment mechanism 48 (arm displacement mechanism) that causes the energizing arm 26 to project out laterally of the vehicle body 62 during traveling (see FIG. 2). Owing thereto, since it is possible for the external power lines 170 to be disposed laterally of the travel path 190, installation of the external power lines 170 can be performed at low cost. More specifically, compared to a case in which the external power lines 170 are arranged upwardly of the vehicle body 62, since it is possible to dispose the external power lines 170 at a lower position, it is possible to simplify equipment for supporting the external power lines 170. Further, although it is necessary to embed the external power lines 170 in the travel path 190 in the case that the external power lines 170 are arranged below the vehicle body 62, in the case that the external power lines 170 are arranged to the side of the travel path 190, there is no need to embed the external power lines 170 in the travel path 190. Therefore, it is possible for the external power lines 170 to be arranged with ease.

II. Modifications

The present invention is not limited to the above-described embodiment, and it goes without saying that various configurations could be adopted therein, based on the content disclosed in the present specification. For example, the following configurations can be adopted.

2A. Vehicle 12

[2A-1. Type of Vehicle 12]

According to the above-described embodiment, a vehicle 12 in the form of a four-wheeled vehicle has been described (see FIG. 2). However, for example, insofar as attention is paid to the power receiving control of the vehicle 12 (see FIG. 6), it is possible for the present invention to be applied to other vehicles apart from a four-wheeled vehicle. For example, the vehicle 12 can be any of a two-wheeled vehicle, a three-wheeled vehicle, and a six-wheeled vehicle. Alternatively, the present invention can be applied to mobile objects (e.g., ships) other than the vehicle 12.

According to the above-described embodiment, the vehicle 12 is assumed to be a so-called electric automobile (battery vehicle) having only the traction motor 20 as a drive source (see FIG. 1). However, for example, insofar as attention is paid to the power receiving control of the vehicle 12 (see FIG. 6), the vehicle 12 may be an electric vehicle other than an electrically powered automobile. For example, the vehicle 12 may be a fuel cell vehicle or a hybrid vehicle.

[2A-2. Circuit Configuration]

According to the above-described embodiment, the electrical circuit configuration for the vehicle 12 is as shown in FIG. 1. However, for example, insofar as attention is paid to the power receiving control of the vehicle 12 (see FIG. 6), the invention is not limited to this feature. For example, it is possible for the position of the converter 28 on the side of the vehicle to be changed.

Figure 10:
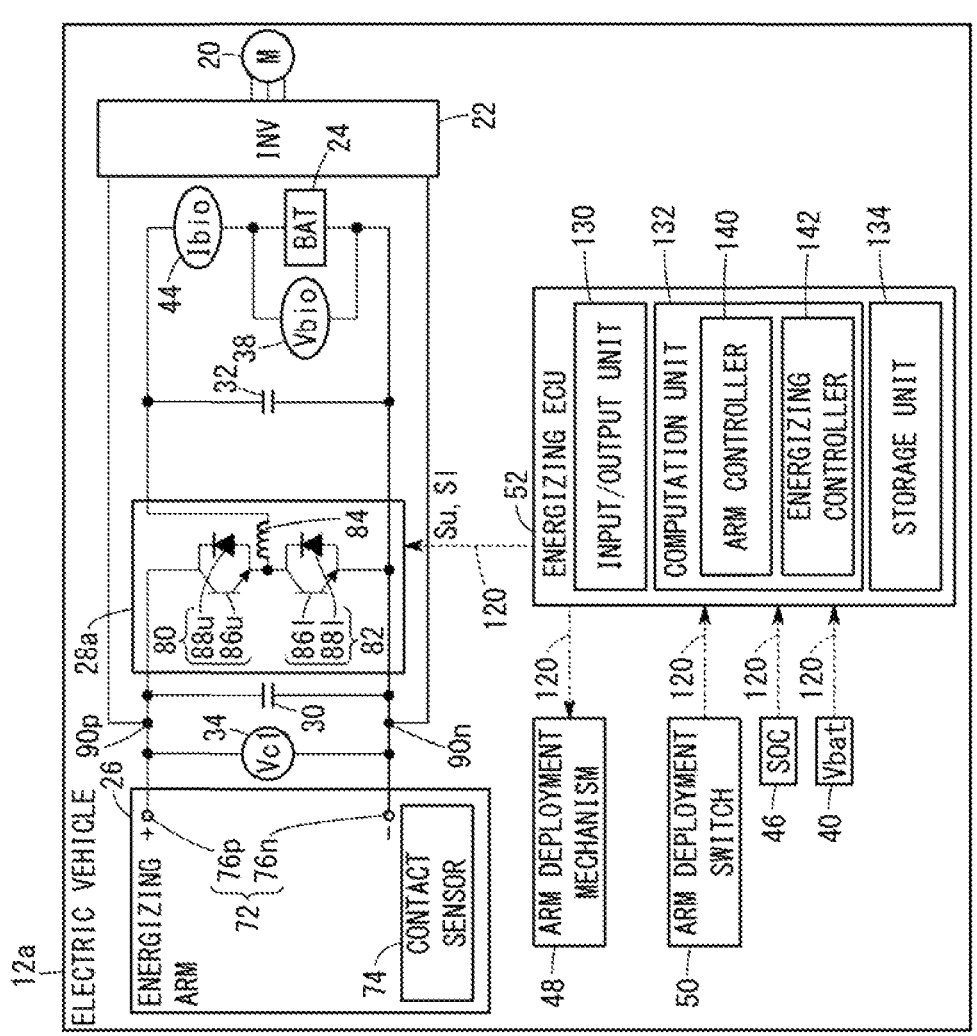
FIG. 10 is an outline schematic view of a charging system equipped with an electric vehicle according to a modification of the present invention.

FIG. 10 is an outline schematic view of a charging system 10A equipped with an electric vehicle 12a (hereinafter also referred to as a "vehicle 12a") according to a modification of the present invention. The converter 28 of the vehicle 12 according to the above-described embodiment is arranged between the power receiving portion 72 and the branch points 90p, 90n (see FIG. 1). In contrast thereto, a converter 28a of the vehicle 12a according to the modification is arranged between the battery 24 and the branch points 90p, 90n (see FIG. 10).

[2A-3. Energizing Arm 26 (Energizing Portion)]

According to the above-described embodiment, the arm 26 is arranged (see FIGS. 2 and 3) so as to be capable of being deployed laterally on the right side of the vehicle body 62. However, for example, insofar as attention is paid to the power receiving control of the vehicle 12 (see FIG. 6), the invention is not limited to this feature, and the arm 26 may be arranged on a left side, an upper side, or a lower side of the vehicle body 62. It should be noted, in the case that the arrangement of the arm 26 is changed, it becomes necessary for the arrangement of the external power lines 170 of the power supplying apparatus 14 also to be changed.

According to the above-described embodiment, when the energizing arm 26 comes into proximity and contacts the contact-type power supplying portion 152, the arm 26 is rotated about the axis off rotation 60 (see FIG. 2). However, for example, insofar as attention is paid to the power receiving control of the vehicle 12 (see FIG. 6), the invention is not limited to this feature. For example, it is possible for a mechanism to be provided that displaces the arm 26 linearly, and which causes the arm 26 to approach and come into contact linearly with the contact-type power supplying portion 152. Alternatively, even in the absence of displacement with respect to the vehicle body 62, a configuration may be provided as an energizing portion, which is capable of contacting the power supplying portion (external power lines 170, etc.) on the side of the power supplying apparatus 14.

2B. External Power Supplying Apparatus 14

[2B-1. External Power Lines 170]

According to the above-described embodiment, the external power lines 170 are disposed in a straight line shape (see FIG. 2). However, for example, insofar as attention is paid to the power receiving control of the vehicle 12 (see FIG. 6), the external power lines 170 may be disposed along a curved road.

[2B-2. Other Features]

According to the above-described embodiment, the external converter 154 is controlled by the control device 162, whereby the power supply voltage Vs of the external power lines 170 is controlled. However, for example, in the case that the power source 150 is constituted in the form of an aggregation of multiple DC power sources (e.g., batteries) connected together in series, it is possible to eliminate the converter 154 and the control device 162.

2C. Power Receiving Control

[2C-1. Generally]

In the above-described embodiment, in the power receiving control, there are included the current limiting control, the direct connection control (voltage and current unlimited control), and the target voltage control (see FIG. 6). However, for example, insofar as attention is focused on the current limiting control and the direct connection control, it is possible to omit the target voltage control.

In the power receiving control according to the above-described embodiment, with the process (e.g., step S14 of FIG. 6) in which the battery input/output voltage Vbio is used as the control object, the converter output voltage Vc2 can also be used. Similarly, with the process (e.g., steps S22, S23, S25 of FIG. 8) in which the battery input/output current Ibio is used as the control object, the converter output current Ic2 can also be used.

[2C-2. Current Limiting Control (First Charging Control)]

With the current limiting control of the above-described embodiment, a control is used for controlling the rate of increase of the battery input/output current Ibio to be less than or equal to a predetermined value (threshold value THΔibio) (see FIG. 8). However, for example, from the standpoint of limiting the current Ibio or a change therein, the invention is not limited to this feature. For example, a constant current control also is possible. More specifically, the ECU 52 may set a target value (target current Ibiotar) for the current Ibio, and the conversion ratio Rcon of the converter 28 may be controlled so that the current Ibio coincides with the target current Ibiotar.

[2C-3. Voltage and Current Unlimited Control (Second Charging Control)]

According to the above-described embodiment, the direct connection control is used as a control (second charging control) that follows the current limiting control (step S15 of FIG. 6). However, for example, from the standpoint of a control (voltage and current unlimited control) in which the voltage Vbio and the current Ibio are not limited directly, the invention is not limited to this feature. For example, it is possible to carry out a target power control in which a target value (target power Pbiotar) of the electrical power supplied to the battery 24 (hereinafter referred to as a "supplied power Pbio", a "battery input/output power Pbio", or a power "Pbio") is set, and the supplied power Pbio is controlled so as to coincide with the target power Pbiotar.

Figure 11:
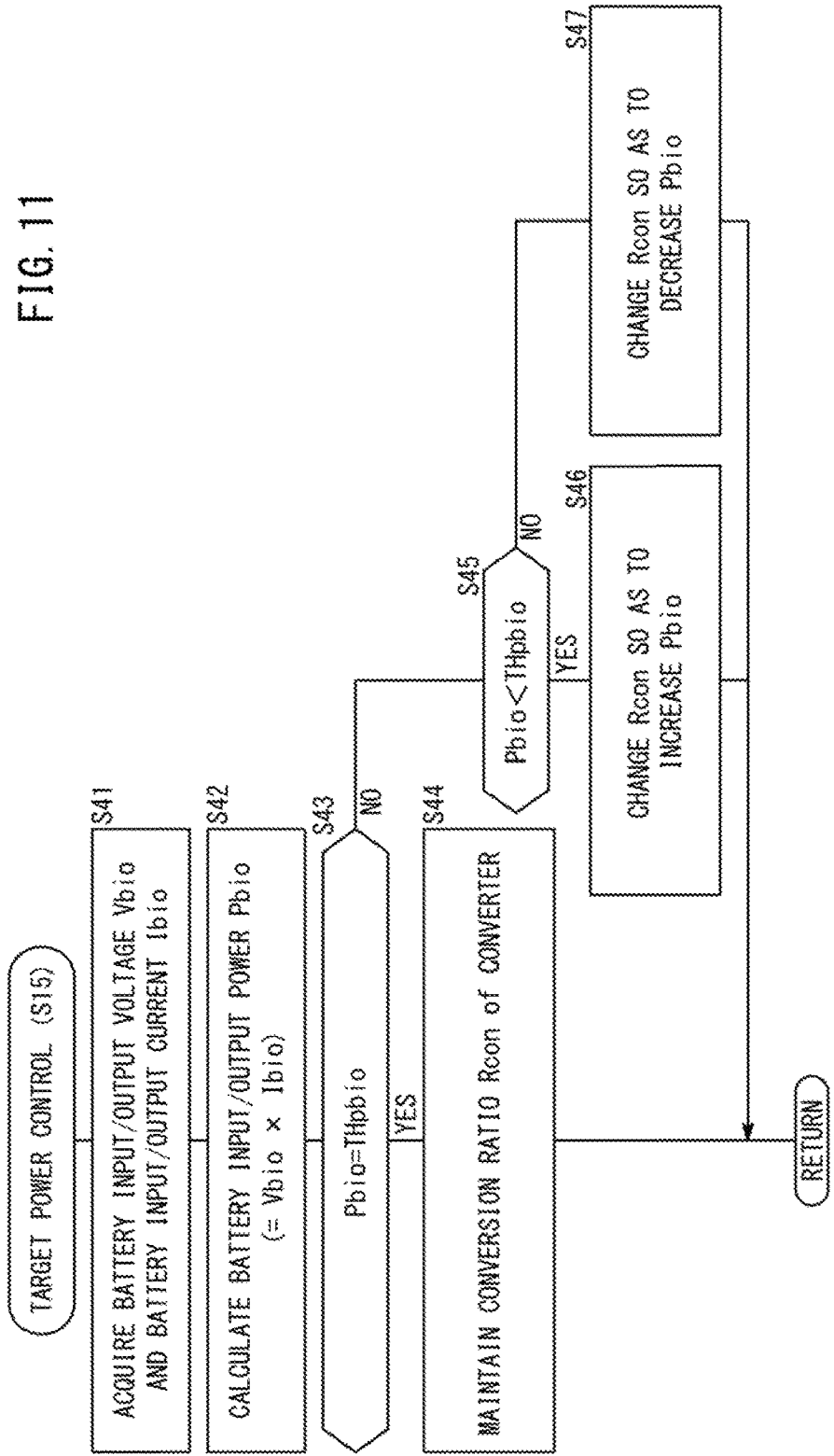
FIG. 11 is a flowchart of a target power control.

FIG. 11 is a flowchart of the target power control. The target power control is used in place of the direct connection control (step S15 of FIG. 6). In step S41, the ECU 52 acquires the battery input/output voltage Vbio and the battery input/output current Ibio. In step S42, the ECU 52 calculates the battery input/output power Pbio by multiplying the voltage Vbio and the current Ibio.

In step S43, the ECU 52 determines whether or not the power Pbio is equal to a threshold value (hereinafter referred to as a "threshold value THpbio"). The threshold value THpbio, for example, can be set to a value that allows the converter 28 to carry out voltage conversion with relatively high efficiency. If the power Pbio equals the threshold value THpbio (step S43: YES), then in step S44, the ECU 52 maintains the conversion ratio Rcon of the converter 28. If the power Pbio is not equal to the threshold value THpbio (step S43: NO), the routine proceeds to step S45. Instead of using the threshold value THpbio (single value), the determination of step S43 can utilize a fixed range that includes the threshold value THpbio.

In step S45, the ECU 52 determines whether or not the power Pbio falls below the threshold value THpbio. If the power Pbio falls below the threshold value THpbio (step S45: YES), then in step S46, the ECU 52 changes the conversion ratio Rcon of the converter 28 so as to increase the input/output power Pbio (and the input/output voltage Vbio).

If the power Pbio does not fall below the threshold value THpbio (step S45: NO), the power Pbio exceeds the threshold value THpbio (Pbio>THpbio). In this case, in step S47, the ECU 52 changes the conversion ratio Rcon of the converter 28 so as to decrease the input/output power Pbio (and the input/output voltage Vbio).

2D. Other Features

According to the above-described embodiment (FIG. 1) and the above described modification (FIG. 10), a configuration has been described in which only supply of electrical power to the vehicle 12 from the power supplying apparatus 14 is carried out. However, conversely, the present invention is capable of being applied to a configuration in which supply of power from the vehicle 12 to the power supplying apparatus 14 is carried out. In this case, insofar as generation of power can be performed by a generator from gasoline or the like in the vehicle 12, it is possible not to provide the battery 24 or an energy storage device for supplying electrical power to the traction motor 20.

According to the above-described embodiment, the present invention is applied to a case in which supply of power by direct current is performed with respect to the vehicle 12 from the power supplying apparatus 14. However, for example, insofar as attention is paid to the power receiving control of the vehicle 12 (see FIG. 6), it is possible for the present invention to be applied to a case in which supply of power by an alternating current is performed with respect to the vehicle 12 from the power supplying apparatus 14.

According to the above-described embodiment, by displacing the energizing arm 26 (energizing portion) of the vehicle 12 with respect to the external power lines 170 (power supplying portion or power supplying lines) of the power supplying apparatus 14, charging is carried out while both contact points undergo movement. Stated otherwise, charging is performed with the external power lines 170 being in a stationary state, and while the arm 26 is in a moving state.

However, for example, insofar as attention is paid to carrying out charging while the contact point on the side of the power supplying apparatus 14 is moved, the invention is not limited to this feature. For example, a configuration is possible in which the power supplying portion of the power supplying apparatus 14 is displaced with respect to the energizing portion of the vehicle 12 (stated otherwise, with the vehicle 12 in a stationary state, charging is carried out while displacing the power supplying portion). In such a case, an energizing portion displacement mechanism is provided in which an energizing portion (for example, the external power lines 170) of the power supplying apparatus 14 is displaced with respect to the energizing portion that remains in a stationary state. Displacement of the energizing portion in this manner, for example, can involve linear movement in one direction or reciprocal movement. Alternatively, in the case that the energizing portion is formed in an arcuate shape or an annular shape, the energizing portion can be subjected to rotational movement.

The invention claimed is:

1. An electric vehicle that travels on a trackless trajectory, wherein:
   the electric vehicle comprises:
   a traction motor;
   an energy storage device configured to supply electrical power to the traction motor;
   an energizing portion configured to come into contact with a power supplying portion and to connect electrically between the power supplying portion and the energy storage device;
   a voltage converter configured to adjust supply of electrical power to the energy storage device from the power supplying portion via the energizing portion; and
   a control unit configured to control the voltage converter;
   wherein the control unit is configured to carry out:
   a first charging control to charge the energy storage device by controlling the voltage converter so as to control an input current or an amount of change per unit time of the input current from the power supplying portion to the energy storage device, wherein the first charging control includes calculating a current difference between a present input/output current of the energy storage device and a previous input/output current of the energy storage device and comparing the current difference with a predetermined threshold value of the current difference to control a duty ratio of the voltage converter; and
   a second charging control to charge the energy storage device with electrical power from the power supplying portion in which a converting operation of the voltage converter is stopped and voltage conversion is not carried out, or to charge the energy storage device by controlling the voltage converter on a basis of a target electrical power which is a target value of electrical power supplied to the energy storage device; and
   furthermore, the control unit is configured to:
   implement the first charging control and the second charging control while a point of contact between the energizing portion and the power supplying portion is moved;
   implement the first charging control when the energizing portion comes into contact with the power supplying portion; and
   implement the second charging control after the first charging control, and for a period of time longer than that of the first charging control.

2. The electric vehicle according to claim 1, wherein, when an input voltage to the energy storage device during the second charging control arrives at a fully charged voltage of the energy storage device, the control unit implements a third charging control to operate the voltage converter so as to maintain the input voltage at the fully charged voltage.

3. The electric vehicle according to claim 1, wherein roller-shaped terminals that contact the power supplying portion are formed on a distal end of the energizing portion.

4. The electric vehicle according to claim 1, wherein the electric vehicle comprises an arm displacement mechanism that causes the energizing portion to project out laterally of a vehicle body during traveling.

5. A vehicle power supplying method for charging an energy storage device of an electric vehicle by electrical power from an external power supplying apparatus in a state in which an energizing portion of the electric vehicle is placed in contact with respect to a power supplying portion of the external power supplying apparatus, wherein:
   the electric vehicle travels on a trackless trajectory;
   in the electric vehicle, there are carried out:
   a first charging control to charge the energy storage device by controlling a voltage converter so as to control an input current or an amount of change per unit time of the input current from the power supplying portion to the energy storage device, wherein the first charging control includes calculating a current difference between a present input/output current of the energy storage device and a previous input/output current of the energy storage device and comparing the current difference with a predetermined threshold value of the current difference to control a duty ratio of the voltage converter; and
   a second charging control to charge the energy storage device with electrical power from the power supplying portion in which a converting operation of the voltage converter is stopped and voltage conversion is not carried out, or to charge the energy storage device by controlling the voltage converter on a basis of a target electrical power value which is a target value of electrical power supplied to the energy storage device;

furthermore, in the electric vehicle:

the first charging control and the second charging control are implemented while a point of contact between the energizing portion and the power supplying portion is moved;

the first charging control is implemented when the energizing portion comes into contact with the power supplying portion; and the second charging control is implemented after the first charging control;

the power supplying portion is capable of initiating contact with the energizing portion and separating away therefrom at arbitrary positions; and when the energizing portion is placed in contact with the power supplying portion, under a condition in which a remaining capacity of the energy storage device is a predetermined value, and a vehicle speed of the electric vehicle or a movement speed of the power supplying portion is an assumed speed or lies within an assumed speed range, the first charging control and the second charging control are completed within a range that is shorter than half a total length of the power supplying portion, and together therewith, implementation time of the second charging control is longer than that of the first charging control.

6. An electric vehicle that travels on a trackless trajectory, wherein:

the electric vehicle comprises:

a traction motor;

an energy storage device configured to supply electrical power to the traction motor;

an energizing portion configured to come into contact with a power supplying portion and to connect electrically between the power supplying portion and the energy storage device;

a voltage converter configured to adjust supply of electrical power to the energy storage device from the power supplying portion via the energizing portion; and a control unit configured to control the voltage converter;

wherein the control unit is configured to carry out:

a first charging control to charge the energy storage device by controlling the voltage converter so as to control an input current or an amount of change per unit time of the input current from the power supplying portion to the energy storage device, wherein the first charging control includes controlling the voltage converter such that a current difference between a present battery input/output current and a previous battery input/output current matches a predetermined value; and a second charging control to charge the energy storage device with electrical power from the power supplying portion in which a converting operation of the voltage converter is stopped and voltage conversion is not carried out, or to charge the energy storage device by controlling the voltage converter on a basis of a target electrical power which is a target value of electrical power supplied to the energy storage device; and furthermore, the control unit is configured to:

implement the first charging control and the second charging control while a point of contact between the energizing portion and the power supplying portion is moved;

implement the first charging control when the energizing portion comes into contact with the power supplying portion; and implement the second charging control after the first charging control, and for a period of time longer than that of the first charging control.

\* \* \* \* \*